US012081619B2

(12) United States Patent
Belkar et al.

(10) Patent No.: US 12,081,619 B2
(45) Date of Patent: Sep. 3, 2024

(54) DEVICES AND METHODS FOR REMOTE DIRECT MEMORY ACCESS

(71) Applicant: HUAWEI TECHNOLOGIES CO., LTD., Shenzhen (CN)

(72) Inventors: Ben-Shahar Belkar, Hod Hasharon (IL); Dima Ruinskiy, Hod Hasharon (IL); Lior Khermosh, Hod Hasharon (IL)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/178,355

(22) Filed: Mar. 3, 2023

(65) Prior Publication Data
US 2023/0231914 A1 Jul. 20, 2023

Related U.S. Application Data

(63) Continuation of application No. PCT/EP2020/074693, filed on Sep. 4, 2020.

(51) Int. Cl.
*H04L 67/1097* (2022.01)
(52) U.S. Cl.
CPC ................... *H04L 67/1097* (2013.01)
(58) Field of Classification Search
None
See application file for complete search history.

(56) References Cited

U.S. PATENT DOCUMENTS

| | | | | |
|---|---|---|---|---|
| 2015/0006841 A1* | 1/2015 | Chen | ................... | G06F 13/1673 711/167 |
| 2017/0031829 A1* | 2/2017 | Wokhlu | .............. | G06F 12/0879 |
| 2018/0365180 A1* | 12/2018 | Craddock | ........... | G06F 12/1009 |
| 2019/0101974 A1* | 4/2019 | Guim Bernat | ........ | G06F 1/3225 |
| 2020/0401440 A1* | 12/2020 | Sankaran | .............. | G06F 9/3004 |

* cited by examiner

*Primary Examiner* — June Sison
(74) *Attorney, Agent, or Firm* — Leydig, Voit & Mayer, Ltd.

(57) ABSTRACT

A requesting device includes a memory, a controller, and a communication interface. The memory is configured to store a plurality of work elements in one or more requesting queues. Each work element indicates a requestor, a responder, and an operation. The controller is configured to retrieve at least a first work element of the plurality of work elements from the memory, generate a first hint message that includes an indication of at least one operation of the first work element, and transmit the first hint message to a first responding device over the communication interface. The first responding device corresponds to a first responder of the first work element. The controller is further configured to transmit a first request relating to the at least one operation of the first work element to the first responding device over the communication interface. The first request indicates the at least one operation.

21 Claims, 8 Drawing Sheets

DEVICES AND METHODS FOR REMOTE DIRECT MEMORY ACCESS

CROSS-REFERENCE TO RELATED APPLICATIONS

This application is a continuation of International Application No. PCT/EP2020/074693, filed on Sep. 4, 2020, the disclosure of which is hereby incorporated by reference in its entirety.

TECHNICAL FIELD

Embodiments of the present disclosure relate to data transfer, and more specifically, to devices and methods for remote direct memory access.

BACKGROUND

In recent years, the High-Performance Computing (HPC) domain has exploited high performance and low latency networks such as InfiniBand over existing Internet Protocol (IP) infrastructure and custom lossless technologies. These interconnects provide advanced network features, such as Remote Direct Memory Access (RDMA), to achieve high throughput and low latency along with low central processing unit (CPU, or processor) utilization. RDMA is being employed in the fields of High-Performance Computing, Data Centres, Web 2.0, Big Data, Cloud, Storage, Finance Services and Insurance (FSI), Medical Services, Federal. However, data communication at high speeds in a network of multiple computing devices augments concern regarding data reliability and latency.

Typically, RDMA involves direct memory access from the memory of one computing device to the memory of another computing device. Notably, RDMA technique does not entail the operating system (OS) of any of the computing devices (i.e. the conventional sending device and the conventional receiving device) enabling a high-throughput, low-latency data transfer over a network, and is particularly useful in deployments where performance is critical. For example, in an exemplary implementation scenario of a conventional RDMA system, such as a RDMA read or write operation, the data (or data packet) is delivered directly from the source memory (such as of a conventional requesting device) to the destination memory (such as of conventional responding device) using an RDMA-capable network adaptor. It does not involve the CPU or the operating system of either of the interacting devices (i.e. the conventional sending device and the conventional receiving device).

A conventional responding device upon receiving data packets from a requesting device, acquires the Queue Pair context (QP context) from host memory into the local cache, issues Direct Memory Access (DMA) requests to the target memory and in case of ATOMIC operations; read the memory, perform the required operation, and write the memory back. Consequently, aforementioned operations acquire considerable processing time and increases the latency during transfer. Moreover, performing these operations at a line rate of modern RDMA Network Interface Controllers (RNICs) (25-400 Gbps) becomes extremely challenging. Thus, in conventional systems, fetching the information from the host memory consumes time and often, requires a few iterations also which results in increased latency and degraded performance.

In an exemplary scenario, wherein a conventional non-pinned RDMA technique may be used to decrease in cost. In the conventional non-pinned RDMA technique, the conventional responding device requires a virtual address (e.g. a target virtual address) of the conventional requesting device for transmitting data. If the virtual address of the conventional requesting device triggers a fault (e.g. a page fault), then the data transmission is stalled or dropped and may result in data retransmission which further increases transaction completion latency. Moreover, the RDMA technique limits the number of messages (or data packets) that can be processed at any given time dependent on the responder (such as the conventional responding device). Consequently, causing errors and faults in RDMA processing during high frequency data transfer for unexpectedly large messages or many small messages.

In light of the foregoing discussion, there exists a need to overcome the aforementioned drawbacks associated with the conventional RDMA technique used for data communication.

SUMMARY

The inventors have realized that unlike the requester (such as a conventional requesting device) which has knowledge (QP context, operation information) regarding the data packets at the time of packet generation, the responder (such as a conventional requesting device) receives the knowledge (QP context), the target memory addresses and the required operation only upon receiving the data packets from the network which results in the increased latency and degraded performance discussed above. However, by enabling the responder to have this knowledge also at the time of generating the data packet, or at least ahead of time, the latency may be decreased and the performance enhanced.

Embodiments of the present disclosure provide requesting devices, responding devices, methods, and a system for remote direct memory access (RDMA). Embodiments of the present disclosure provide a solution to the existing problem of inefficient and unreliable data communication by virtue of the conventional devices, methods, and the conventional remote direct memory access system. Embodiments of the present disclosure provide a solution that overcomes at least partially the problems encountered in prior art, and provides improved devices, methods, and a system for an efficient (e.g. reduced latency) and reliable data communication for RDMA operations.

In one aspect, embodiments of the present disclosure provide a requesting device. The requesting device comprises a memory, a controller and a communication interface. The memory is configured to store a plurality of work elements in one or more requesting queues. Each work element indicating a requestor, a responder and an operation. The controller is configured to retrieve one or more of the work elements from the memory. The controller is further configured to generate a hint message, the hint message comprises an indication of at least one operation of a corresponding at least one work element of the retrieved one or more work elements. The controller is also configured to transmit the hint message to a responding device over the communication interface. The responding device corresponding to the responder of the at least one work element of the retrieved one or more work elements. The controller is further configured to transmit a request relating to the operation of at least one work element of the retrieved one or more work elements to the responding device over the communication interface, the request indicating the operation.

The requesting device of the present disclosure enables multiple hint messages to be transmitted at once and allows the responding device to optimize various aspects by virtue of memory prefetching, cache-warmup and multiple atomic operations into the hardware. These operations are employed to enable the responding device to start prefetching the memory areas (if necessary) ahead of time or prepare to accept the incoming data packets in an efficient manner. Further, transmitting multiple hints relating to multiple transactions (or operations) at once allows the responding device to start preparing memory for each of them and having a much higher chance of being serviced without page faults. Furthermore, in case of atomic operations, the responder can start reading the atomic data packets into a preferred local memory (such as RNIC cache) before the data packets arrive allowing the responding device to perform the atomic operations and transmit confirmation messages with very low latency.

In an implementation form, the work element further includes an object list comprising one or more objects on which the operation is to be performed, and wherein the hint message further includes an indication of at least one of the one or more objects.

The one or more objects included in the object lists are data transfer objects (DTO). The one or more objects are employed to reduce the number of calls during communication between processes usually done resorting to remote interfaces (e.g., web services), where each call is an expensive operation. The one or more objects (the DTOs) enable in aggregation of the data being conventionally transferred by the several calls, is served by a single call.

In a further implementation form, one or more work elements of the retrieved one or more work elements are for a first responder and one or more work elements of the retrieved one or more work elements are for a second responder. The controller is further configured to generate the hint message and transmit the hint message to the responding device by generating a first hint message and transmitting the first hint message to a first responding device corresponding to the first responder, and generating a second hint message and transmitting the second hint message to a second responding device corresponding to the second responder.

Sending multiple hint messages (i.e. the first hint message, the second hint message) for multiple transactions with different responders (i.e. the first responder, the second responder) at once allows the respective responders to start preparing memory for all of them and having a much higher chance of being serviced without page faults.

In a further implementation form, one or more work elements of the retrieved one or more work elements are related to a first requestor, and one or more work elements of the retrieved one or more work elements are related to a second requestor.

In an implementation form, the controller is further configured to receive a confirmation message from the responding device prior to transmitting the request relating to the operation.

The confirmation message received from the responding device allows the requesting device to adapt or configure the transmission of the data packets, accordingly, aiding to a fault free operation. Typically, the confirmation message implies that the first message is successfully transmitted to the receiving device. The controller upon receiving the confirmation message transmits the request relating to the operation regardless of any external factor. The acknowledgement message reduces the total execution time of the data transfer and improves the latency. The improved latency indicative of data communication at a higher speed.

In a further implementation form, the controller is further configured to retrieve a batch of work elements, and to change the size of the batch during operation.

The controller is enabled to change the size of the batch of work elements and allows the requester (or requesting device) to perform look-ahead at the requests queued in the Send Queue, up to a preconfigured depth allowing to gather information about the data packets prior to actually receiving the data, and better preparation of the memory area leading to a faster data communication and reduced latency.

In an implementation form, the hint message further includes an indication of a memory area related to the operation.

The indication of the memory area in the hint message allows the responding device to allocate the specified memory area prior to receiving the data packets to speed up the data communication.

In a further implementation form, the indication of the memory area and the operation includes an address to the memory area on which the operation is to be performed. The inclusion of an address to the indication of the memory area and the operation on which the operation is to be performed allows the responder (or responding device) to better prepare the memory area and consequently perform the operation efficiently.

In a further implementation form, the indication of the memory area and the operation includes a prefetch operation for prefetching the indicated memory area.

The inclusion of a prefetch operation for prefetching the indicated memory area allows the responder (or responding device) to prefetch memory ranges to reduce or eliminate page faults when requests arrive.

In a further implementation form, the indication of the memory area and the operation includes a cache warm up operation.

The inclusion of a cache warm up operation for preparing (or warming-up) the indicated memory area allows the responder (or responding device) to prefetch memory ranges to bring respective QP context into the cache memory to reduce latencies when requests arrive.

In a further implementation form, the indication of the memory area and the operation includes an atomic operation.

The inclusion of an atomic operation for preparing the indicated memory area allows the responder (or responding device) to read the atomic targets into the RNIC to speed-up calculations when requests arrive.

In an implementation form, the hint message is a dedicated hint command message.

The dedicated hint message allows the hint message to be configured to be adapted based on the requirements of the responder, requestor or data communication to improve the overall efficiency of the system.

In a further implementation form, the hint message, comprises the indication of the operation as an additional payload of a command message of another command.

In an implementation form, the requesting device is arranged for RDMA.

The arrangement of the requesting device for RDMA enables the requesting device to send and receive data to and from remote buffers (Zero-copy), Access remote server's memory without consuming CPU cycles on the remote server (Low CPU involvement), have an improved latency and throughput (Kernel bypass), to have convergence i.e. being support by a single structure for storage and computing.

In another aspect, embodiments of the present disclosure provide a requesting device. The requesting device comprises a memory and a communication interface, and software modules. The software modules include a work element storing module for storing a plurality of work elements in one or more requesting queues in the memory, each work element indicating a requestor, a responder and an operation. The software modules also include a work element retrieval module for retrieving at least one of the work elements from the memory. The software modules further include a hint message generation module for generating a hint message, the hint message comprising an indication of at least one operation of a corresponding at least one work element of the retrieved one or more work elements. The software modules also include a hint message transmission module for transmitting the hint message to a responding device over the communication interface, the responding device corresponding to the responder of the at least one work element of the retrieved one or more work elements. The software modules further include a request transmission module for transmitting a request relating to the operation of at least one work element of the retrieved one or more work elements to the responding device over the communication interface, the request indicating the operation.

The software modules are executed to enable the requesting device to store and retrieve a plurality of work elements in one or more requesting queues for proper ordering and enabling transmission of the work elements upon requirement. Further, the software modules further generate and transmit a hint message comprising indication of at least one operation. Beneficially, the hint message enables the responding device to prepare the memory area for incoming work elements for a faster and more efficient data communication. Furthermore, the software modules are executed to transmitting a request relating to the operation to the responding device to enable the requesting device to commence the transmission of data packets reducing page faults and increasing the data communication reliability.

In yet another aspect, embodiments of the present disclosure provide a method for a requesting device. The method comprises storing a plurality of work elements in one or more requesting queues in the memory, each work element indicating a requestor, a responder and an operation. The method also comprises retrieving at least one of the work elements from the memory. The method further comprises generating a hint message, the hint message comprising an indication of at least one operation of a corresponding at least one work element of the retrieved one or more work elements. The method also comprises transmitting the hint message to a responding device over the communication interface, the responding device corresponding to the responder of the at least one work element of the retrieved one or more work elements. The method further comprises transmitting a request relating to the operation of at least one work element of the retrieved one or more work elements to the responding device over the communication interface, the request indicating the operation.

The method of this aspect achieves all the advantages and effects of the requesting device of the present disclosure.

In still another aspect, embodiments of the present disclosure provide a computer-readable medium carrying computer instructions that when loaded into and executed by a controller of a requesting device enables the requesting device to implement the method.

The computer-readable medium (e.g., a non-transitory computer-readable medium) carrying computer instructions achieves all the advantages and effects of the sending device, or the method.

In an aspect, embodiments of the present disclosure provide a responding device. The responding device comprises a memory, a controller and a communication interface. The controller is configured to receive a hint message from a requesting device over the communication interface, the hint message comprising an indication of at least one operation. The controller is further configured to determine a pre-emptive action based on the indication of the at least one operation. The controller is also configured to execute the pre-emptive action. The controller is further configured to receive a request relating to the at least one operation from the requesting device over the communication interface, the request indicating at least one of the at least one operation. The controller is also configured to execute the at least one of the at least one operation.

As the pre-emptive action is associated with the at least one operation, the controller of the responding device determines the pre-emptive action based on the indication of the at least one operation in the hint message and respond accordingly to prepare the associated memory area for a faster data communication. In an example, the pre-emptive action includes a cache warmup operation to populate the data into the cache memory for a faster data communication. Beneficially, these pre-emptive actions executed by the responding device greatly reduce latencies in servicing the RDMA messages themselves as they reach the responding device and makes the data communication more efficient.

In an implementation form, the operation relates to a memory area and wherein the controller is further configured to determine the pre-emptive action based on the memory area and the operation, and to execute the pre-emptive action by determining if a loading of the memory area is required, and if so, loading the memory area into the memory.

The execution of the pre-emptive action by determining a need for a loading of memory area prior to executing the pre-emptive action reduces the overall time taken for the data communication by eliminating the possibility of wasted effort if a need for populating the memory is not needed. Further, the determination also reduces the chances of page faults significantly due to the unpopulated memory area.

In a further implementation form, the controller is further configured to transmit a confirmation message to the requesting device, the confirmation message indicating whether the pre-emptive action was successful or not.

The confirmation message received from the controller of the responding device allows the requesting device to adapt or configure the transmission of the data packets, accordingly, aiding to a fault free operation. Typically, the confirmation message implies that the first message is successfully transmitted to the receiving device. The controller upon receiving the confirmation message transmits the request relating to the operation regardless of any external factor. The acknowledgement message reduces the total execution time of the data transfer and improves the latency. The improved latency indicative of data communication at a higher speed.

In another aspect, embodiments of the present disclosure provide a method for a responding device. The method comprises receiving a hint message from a requesting device, the hint message comprising an indication of at least one operation. The method also comprises determining a pre-emptive action based on the indication of the at least one operation. The method further comprises executing the pre-emptive action. The method also comprises receiving a request relating to the at least one operation from the requesting device, the request indicating at least one of the at least one operation. The method further comprises executing the at least one of the at least one operation.

The method of the aspect achieves all the advantages and effects of the receiving device of the present disclosure.

In an implementation form, the present disclosure provides a computer-readable medium carrying computer instructions that when loaded into and executed by a controller of a responding device enables the responding device to implement the method.

The computer-readable medium carrying computer instructions achieves all the advantages and effects of the receiving device, or the method.

In yet another aspect, embodiments of the present disclosure provide a responding device. The responding device comprises a memory, a communication interface, and software modules. The software modules include a hint message receiving module for receiving a hint message from a requesting device, the hint message comprising an indication of at least one operation. The software modules also include a pre-emptive action determination module for determining a pre-emptive action based on the indication of the at least one operation. The software modules further include a pre-emptive action execution module for executing the pre-emptive action. The software modules also include a request receiving module for receiving a request relating to the at least one operation from the requesting device, the request indicating at least one of the at least one operation. The software modules further include an operation execution module for executing the at least one of the at least one operation.

The software modules are executed to determine a pre-emptive action based on the indication of the at least one operation. Beneficially, the determination is based on the requirements (in hint message) of the requesting device enabling the responding device to determine the most suitable option to decrease the possibility of page faults and enable in a better preparation of the memory area, leading to a more efficient data communication.

It is to be appreciated that all the aforementioned implementation forms can be combined.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, an exemplary functionality or step to be performed by external entities is not reflected in the description of an exemplary detailed element of that entity which performs that exemplary step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features and objects of the present disclosure would be made apparent from the drawings and the detailed description of the illustrative implementations construed in conjunction with the appended claims that follow.

BRIEF DESCRIPTION OF THE DRAWINGS

For the purpose of illustrating embodiments of the present disclosure, exemplary constructions of the embodiments are shown in the drawings. However, the present disclosure is not limited to exemplary methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
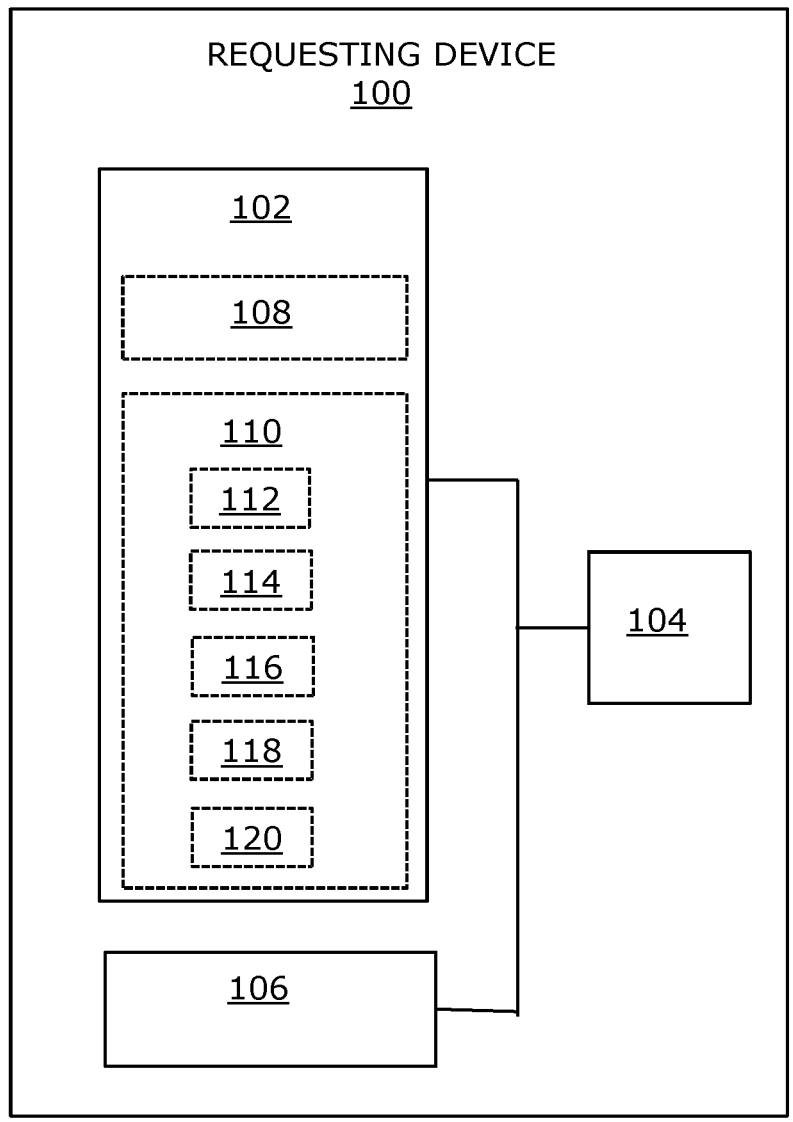
FIG. 1 is block diagram of a requesting device operable to perform a Remote Direct Memory Access (RDMA) operation, in accordance with an embodiment of the present disclosure.

Referring now to FIG. 1, illustrated is a block diagram of a requesting device 100 operable to perform a Remote Direct Memory Access (RDMA) operation, in accordance with an embodiment of the present disclosure. FIG. 1 mainly illustrates various exemplary components of the requesting device 100. As shown, the requesting device 100 comprises a memory 102 configured to store a plurality of work elements 108. The requesting device 100 further comprises a controller 104 and a communication interface 106.

The requesting device 100 is arranged for RDMA. Typically, the requesting device 100 is configured and operable to perform RDMA operations in conjunction with a responding device (not shown in FIG. 1, explained in greater details herein later in conjunction with FIG. 3). The requesting device 100 can directly access a memory of the responding device without involving the operating system (OS) of the requesting device 100 and the responding device. Notably, the data packets are transferred directly without being copied between communication channel layers (such as a network layer, an application layer, a transport layer and a link layer) of the requesting device 100 and the responding device. Each of the communication channel layers is configured to perform a specific function such as transportation, encryption and the like. The combination of the communication channel layers enable communication across different interactive devices such as the requesting device 100 and the responding device.

The data packets are derived from the work element(s). The work element comprises information related to the packet sequence number (PSN) to enforce correct packet ordering. The work element further comprises source and destination queue pair (QP) numbers, which distinguish an application and valid memory regions for the application. In one embodiment, the memory region has a memory key (R-key) that is part of the data packet, which associates the memory region with the applicant, and vice-versa. The work element further comprises information related to an operation type (such as a RDMA READ, a RDMA WRITE, a SEND, or an ATOMIC) and parameters of the operations such as (a message length, a target memory address, an operation type and an operand data).

The responding device is configured to reassemble the incoming data packets based on a header such as a Base Transport Header (BTH) that includes at least the destination queue pair number and packet sequence number. In an example, the BTH header includes at least the target memory address, length of the RDMA operation, and optionally a remote key operable to identify the target memory address and for providing access. In case of atomic operations, the BTH header includes at least an opcode (i.e. the operation code), the target memory address, data packets to be swapped or compared, and a remote key for access. It will be apparent that the requesting device 100 would include a Queue Pair (QP), i.e. a Send Queue (SQ) and a Receive Queue (RQ). Further, the SQ of the QP would include the work elements carrying the responder details.

According to an embodiment, the requesting device 100 includes suitable logic, circuitry, interfaces and/or code that is configured for use in high-speed data communication. The requesting device 100 can directly access memory of the requesting device 100 for executing any RDMA operation such as the RDMA READ, the RDMA WRITE, the SEND, or the ATOMIC operations.

The requesting device 100 can be potentially used as a sending device (or a sender). Examples of the requesting device 100 may include, but are not limited to, a communication channel adapter, a server, a computing device in a computer cluster (e.g. massively parallel computer clusters), a communication apparatus including a portable or non-portable electronic device, a wireless modem, a supercomputer, or other RDMA-based device. Similarly, the responding device includes suitable logic, circuitry, interfaces and/or code that is configured for use in the high-speed data communication. Further, the responding device can be potentially used as a receiving device (or a receiver) during operation. Examples of the responding device may include, but are not limited to, a communication channel adapter, a server, a computing device in a computer cluster (e.g. massively parallel computer clusters), a communication apparatus including a portable or non-portable electronic device, a wireless modem, a supercomputer, or other RDMA-based device. According to the present disclosure, the responding device prepares its memory 102 (e.g. local memory buffers) soon after receiving an event data packet, such as the "hint" data packet, from the requesting device 100 in order to reduce the response time, which is explained herein later in greater detail.

The memory 102 of the requesting device 100 is configured to store a plurality of work elements 108 in one or more requesting queues. Each work element (of the plurality of work elements 108) indicating a requestor (such as the requesting device 100), a responder (such as the responding device or the receiver) and an operation. The memory 102 includes suitable logic, circuitry, and/or interfaces that is configured to store instructions executable to control operations of the requesting device 100. For example, the memory 102 may store an operating system and/or other program products to operate the requesting device 100. The memory 102 may store data (communicated in the form of work elements or data packets) for processing at the requesting device 100. Examples of implementation of the memory 102 may include, but are not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

In an embodiment, each of the plurality of work elements 108 further includes an object list comprising one or more objects on which the operation is to be performed. The object list refers to a linear data structure wherein each element is a separate object. The object refers to the carrier or container of data between processes configured to be adapted for storage, retrieval, serialization and deserialization of data packets. Notably, the objects do not comprise any inherent business logic and used primarily for data transfer and encapsulating one or more parameters during operation. The one or more objects are employed to perform the operation. Further, the one or more objects included in the object lists are data transfer objects (DTO). The one or more objects are employed to reduce the number of calls during communication between processes usually done resorting to remote interfaces (e.g., web services), where each call is an expensive operation. The one or more objects (the DTOs) enable in aggregation of the data being conventionally transferred by the several calls, is served by a single call.

The communication interface 106 of the requesting device 100 includes a medium (e.g. a communication channel) through which the requesting device 100 communicates with the responding device. Examples of the communication interface 106 include, but are not limited to, a communication channel in a computer cluster, a Local Area Network (LAN) Communication channel, a cellular communication channel, a wireless sensor communication channel (WSN), a cloud communication channel, a vehicle-to-communication network (V2N) communication channel, a Metropolitan Area Network (MAN) Communication channel, and/or the Internet. Further, the requesting device 100 in the communication channel environment is configured to connect to the responding device, in accordance with various communication channel protocols which support RDMA communication. Examples of such communication channel protocols, communication standards, and technologies may include, but are not limited to, InfiniBand (IB), RDMA over converged Ethernet (RoCE), internet wide area RDMA protocol (iWARP), or modifications and variations thereof.

According to an embodiment, the communication interface 106 is an arrangement of interconnected programmable and/or non-programmable components that are configured to facilitate data communication between one or more electronic devices. For example, the communication interface 106 refers to a network interface card (NIC) configured to process a send queue (SQ), read work queue elements (WQE) and generates data packets to send to the other computing device. The communication interface 106 may support communication protocols for one or more peer-to-peer network, a hybrid peer-to-peer network, local area networks (LANs), radio access networks (RANs), metropolitan area networks (MANs), wide area networks (WANs), all or a portion of a public network such as the global computer network known as the Internet, a private network, a cellular network and any other communication system or systems at one or more locations. Additionally, the communication interface 106 supports wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed and supported by the communication interface 106.

In the present disclosure, the controller 104 is a RDMA controller that includes suitable logic, circuitry, and/or interfaces that is configured to generate a hint message, which comprises an indication of an operation type. The controller 104 is a computational element that is configured to processes instructions that drive the requesting device 100. Examples of the controller 104 includes, but are not limited to, a network interface controller, a microprocessor, a microcontroller, a complex instruction set computing (CISC) microprocessor, a reduced instruction set (RISC) microprocessor or a very long instruction word (VLIW) microprocessor. Optionally, one or more controllers similar to the controller 104, interacting devices (such as the requesting device 100, the responding device) and elements may be arranged in various architectures for responding to and processing the instructions that drive the requesting device 100.

In operation, the controller 104 is configured to retrieve one or more work elements of the plurality of work elements 108 from the memory 102 of the requesting device 100. The one or more retrieved work elements are stored in one or more requesting queues (or send queue). The requesting queue refers to an abstract data structure configured to store a plurality of work elements in a specified order.

In an embodiment, the controller 104 is configured to retrieve a batch of work elements, and to change the size of the batch during operation. The controller 104 is configured process to plurality of work elements 108 in batches, i.e. by segregating the plurality of work elements 108 in batches having one or more work elements therein, while retrieving such work elements from the memory 102. The controller 104 is configured to change the size of the batch of work elements by performing look-ahead at requests queued in the one or more responding queues (corresponding to the one or more requesting queues of the requesting device 100), up to a preconfigured depth allowing to gather information about the incoming data packets prior to actually retrieving the work elements 108. The batch of the work elements may be of the order of 4, 8, 32, 64 and so forth, and said upcoming batch of work elements are known to the responding device through the hint message. The controller 104 may perform look-ahead on a single QP request queue, and/or the requesting device 100 may perform parallel look-ahead in multiple QP's request queues targeting the same responding device (or responder) as the host (using a different special QP to transmit the hints). Moreover, the requesting device 100 may also process the parallel QPs that target different responders.

The controller 104 is configured to generate the hint message, and the hint message comprises an indication of at least one operation of a corresponding at least one work element of the retrieved one or more work elements. The hint message is generated by the controller 104 to initiate the RDMA operation(s) with the responding device.

The controller 104 is configured to generate the hint message based on each of the one or more work elements, wherein each work element indicating a requestor (such as the requesting device 100), a responder (i.e. the responding device) and the operation (or operation type). The hint message indicates the operation (or operation type) such as a RDMA read operation, a RDMA write operation, a send operation, or an atomic operation. The hint message is transmitted, for example, in the form of data packet(s). The hint message further comprises source and destination queue pair (QP) numbers. For example, each QP number has a context at the requesting device 100 and at the responding device.

In another embodiment, the work element further includes an object list comprising one or more objects on which the operation is to be performed, and wherein the hint message further includes an indication of at least one of the one or more objects. The one or more objects included in the object lists are data transfer objects (DTO). The one or more objects are employed to reduce the number of calls during communication between processes usually done resorting to remote interfaces (e.g., web services), where each call is an expensive operation. The one or more objects (the DTOs) enable in aggregation of the data being conventionally transferred by the several calls, is served by a single call. The one or more objects included in the object list are employed to perform the operations (such as the RDMA read operation, RDMA write operation) and the hint message includes an indication of at least one of the one or more objects relating to the at least one operation.

In an embodiment, the hint message further includes an indication of a memory area related to the operation. The memory area refers to a target memory area wherein the operation (such as RDMA read operation, RDMA write operation, RDMA atomic operation) is to be performed. For example, the hint message includes the indication of the memory area of the responding device where the operation is to be performed.

In another embodiment, the hint message includes the indication of the memory area and the operation further includes an address to the memory area on which the operation is to be performed. The address to the memory area includes a target memory address for the operations. In an example, if the first operation is a RDMA read operation and is associated with a memory area. Then the RDMA read operation is performed by reading a particular value or data at the memory area (or memory address). Further, if the second operation is a RDMA write operation, said operation is performed by writing a particular value or data at the memory area (or memory address). The memory area for the said operations may or may not be the same. In an example, the operation may not be performed on a same memory area, alternatively, may be subsequently performed on the same memory area.

According to an embodiment, the hint message further comprises various parameters such as a message length, an operation type and an operand data. The operand data refers to the data associated with the one or more objects in the object list upon which the operation is being performed. The message length includes the length of the RDMA read operation or the RDMA write operation. The send operation does not have or require a target memory address. Moreover, the operation type and operand data is included for the atomic operation.

The operation type may be a tagged operation (such as the RDMA read, RDMA write or atomic operation) or an untagged operation type (such as the RDMA send). Herein, for tagged operations, the hint message includes the RDMA target information including target memory address and the length of the operation (such as the length of RDMA write or RDMA read operation), which are determined from the at least one work element of the retrieved one or more work elements 108. Further, the target memory address and the length of the operation are placed in the header of the hint message. On the other hand, for untagged operations (such as the RDMA send operation), the hint message does not include RDMA target information. However, in such an instance wherein the RDMA target information is not available, the operation targets the one or more requesting queues at the responding device, and wherein the local RDMA target information is specified. In one embodiment, wherein the RDMA target information is not available, the hint message comprises a count indicating how many untagged messages are to be expected so that the responding device is enabled to prepare sufficient buffer space for receiving the upcoming messages.

In another embodiment, the hint message including the indication of the memory area and the operation includes a prefetch operation for prefetching the indicated memory area. For example, such hint message, which includes a prefetch operation, may be considered as "prefetch hint" The prefetch operation is a technique for speeding up fetch operations by beginning a fetch operation before retrieving the data packets. The prefetch operation employs the prefetch hint transmitted before the data packets are transmitted. The pre-fetch operation enables the responding device to start prefetching the memory area (or the memory ranges) relating to the operation as per requirement, or commence preparation to receive the incoming data packets while employing other techniques such as, but not limited to, scratchpad buffers, memory allocation and so forth. In an example, the prefetch hint may include a list of tuples comprising at least one of a remote key, a target memory address, length of the operation for tagged operations and sequence ID and the total number of incoming messages for untagged operations. The responding device employs the hint message including the prefetch hint to reduce or eliminate page faults. The page fault refers to a type of exception raised by a computer hardware when a running program accesses a memory page that is not currently mapped by the responding device into the target memory address space relating to an operation (or a process). Further, transmitting hint message including one or more prefetch hints for a plurality of transactions (or data transfers) at the same time enables the responding device to commence preparation of the memory area in accordance with each of the one or more prefetch hints. The prefetch operation has several benefits including lower number of page faults. In an example, even if a first transaction has to be stalled or stopped due to inefficient mapping (paging-in memory) or mapping at an insufficient rate by the responding device, the subsequent transactions (such as the second transaction, third transaction) have a much higher chance of being serviced without page faults.

In another embodiment, the hint message includes the indication of the memory area and the operation includes a cache warm-up operation. For example, such hint message, which includes a cache warm-up operation, may be considered as "cache warm-up hint". In an example, upon transmitting the hint message comprising at least the list of queue pairs and the target memory areas relating to the incoming data packets (or the work elements 108), the responding device is enabled to extract the queue pair (QP) context into a pre-defined memory region (or a cache memory) or perform the cache warm-up operation. The cache warm-up operation refers to populating the cache memory to boost the execution performance upon subsequent transactions. In an example, the first transaction after a cache is populated will go through an empty or cold cache and experience a "cache miss" since for a first transaction the cache memory will retrieve the data packets from the memory 102 of the requesting device 100 to perform the warm-up cache operation. Each subsequent transaction can be serviced from the cache memory upon warm-up to ultimately reduce the latencies and boosting the execution performance while receiving the incoming data packets.

Additionally, the responding device can issue an on-demand paging (ODP) requests for specific memory regions known as ODP memory regions (similar to "prefetch hint" mechanism) to significantly reduce latencies associated with servicing the RDMA messages themselves upon receiving by the responding device. The ODP is a technique employed to ease the memory registration for the incoming data packets. Herein, the need to pin down the underlying physical target address space and track the validity of the mappings is eliminated. Rather, the hint message including the indication of the memory area and the operation includes a request for the latest translations from the responder (or the responding device) when the memory areas are not present, and the responding device invalidates the translations which are no longer valid due to either non-present memory areas or mapping changes.

In another embodiment, the indication of the memory area and the operation includes an atomic operation. The atomic operation is an operation performed as a single unit of work (i.e. a single work element) during which a processor can simultaneously read a target address and write it in the same operation. This prevents any other processor or I/O device from writing or reading memory until the operation is complete. In other words, atomic operations (such as the RDMA fetch and add operation and RDMA compare and swap operation) are not interfered during operation. The hint message includes a list of atomic operations for the responder to read the targets for the atomic operation to boost up the speed of the calculations when the request form RDMA access is received.

According to an embodiment, the hint message is a dedicated hint command message (Opcode). For example, the hint message can be dedicated or configured to adapt to the implementation requirements of the RDMA system or a specific responding device. For instance, the controller 104 of the requesting device 100 configures each hint message (also referred to herein as a command message) to send in one or more data packets with a header (such as BTH) and an optional additional payload. Notably, the header provides basic information (e.g., a start indicator, length of the data packet, and optionally a command code identifying a command to be processed by the responding device), while the payload provides any data associated with the command message. Notably, the amount of associated data with command message can be different for different commands, and some commands may provide for variable-length payloads. In some embodiments, the commands may be defined such that any particular command message is valid in a single direction during data communication. Optionally, the payload includes only the command of the command message and the associated data, and the controller 104 can generate additional information pertinent to the data communication, or the interacting computing devices (such as the requesting device 100, the responding device) before forwarding the data packet (or the command message) to the responding device.

In an embodiment, the hint message comprises the indication of the operation (such as the RDMA read, RDMA write operation) as an additional payload of a command message (a first command message) of another command. The requesting device 100 indicates the operation as an additional payload of a command message. Herein, the command message includes a command (such as an instruction of an operation) and a payload. The payload refers to any parameters or data associated with each command message. Further, the payload includes tokens related to physical capabilities, processing capabilities, and other additional information required by the responding device. The controller 104 can determine whether the command in the command message is a data transmission command or a data retrieving command. In an example, the controller 104 determines a data transmitting command can communicate a message corresponding to the payload of the data transmitting command to the responder (or the responding device). Moreover, the command message including the data transmitting command instructs the controller 104 of the requesting device 100 to extract the command message (including any associated data) and forward the command message (and associated data where applicable) to the responding device.

In an example, the hint message may be associated with multiple QPs. In such an instance, the controller 104 has the lookup depth for the work elements in the requesting queues. Accordingly, the controller 104 generates the hint message based on the multiple QPs. Below are exemplary tables depicting data associated with multiple work elements in the multiple QPs, and corresponding generated hint message.

As shown in Table 1, there are 4 work elements associated with the Send Queues of the Queue Pairs. For example, the column 1 shows number of work elements, the column 2 shows QPs associated with said work elements, the column 3 shows indication of at least one operation associated with said work elements, and the column 4 shows parameters or attributes associated the work elements. In other words, table 1 shows the data associated with work elements of the retrieved one or more work elements from the memory 102 based on which the Hint message is generated.

TABLE 1

| No. | QP | TYPE | PARAMETERS |
|-----|----|----|-----|
| 1 | 14 | READ | R_KEY = 30, VA = 0x1000, LENGTH = 0x8000 |
| 2 | 17 | WRITE | R_KEY = 40, VA = 0x100000, LENGTH = 0x3000 |

TABLE 1-continued

| No. | QP | TYPE | PARAMETERS |
|-----|----|----|-----|
| 3 | 14 | READ | R_KEY = 30, VA = 0x50000, LENGTH = 0x1000 |
| 4 | 23 | ATOMIC | R_KEY = 50, VA = 0x60000, OP = fetch & add |

Referring now to Table 2, shown is an exemplary hint message (or information carried by a hint packet) corresponding to Table 1, i.e. based on the work elements of Table 1. As shown, the hint message includes following information, i.e. row 1 includes details of Queue Pair numbers, and rows 2 and 3 include memory details and operation indication (or type), required for accomplishing RDMA operations based on the work elements.

TABLE 2

| QPNs | 14, 17, 23 |
|------|------------|
| Memory Ranges | (30, 0x1000, 0x8000, READ) |
| (R_Key, start, | (40, 0x100000, 0x3000, WRITE) |
| length, type) | (30, 0x50000, 0x1000, READ) |
| Atomic Operations | (R_KEY 50, OFFSET 0x60000, OP fetch & add) |

In another example, the hint message may be generated based on a single QP. Further, the single QP may be associated with multiple work elements. Referring now to Table 3, shown is the data associated with work elements of the retrieved one or more work elements from the memory 102 based on which the hint message is generated. As shown, column 1 (of table 3) shows of the number of work elements, column 2 shows indication of at least one operation associated with said work elements, and column 3 shows parameters or attributes associated the work elements. In the present example, the hint message further associated with an operation, such as the prefetch operation for prefetching the indicated memory area. As shown, there are 6 work elements and based on that memory prefetching hint (for example when using RDMA on-demand-paging, ODP, approach) is to be generated. The controller 104 sees the work element index in the SQ, for example of QP #4. Thereafter, the controller 104 generates a hint message (or hint packet) over the same QP that the data path is using (QP 4) and sends it to the responding device.

TABLE 3

| WQE IDX | TYPE | PARAMETERS (Destination ones as there are more on the SQ WQE) |
|---------|------|---------------------------------------------------|
| 1 | READ | R_KEY = 30, VA = 0x1000, LENGTH = 0x8000 |
| 2 | WRITE | R_KEY = 40, VA = 0x100000, LENGTH = 0x3000 |
| 3 | SEND | LENGTH = 0x1000 |
| 4 | SEND | LENGTH = 0x1000 |
| 5 | SEND | LENGTH = 0x1000 |
| 6 | SEND | LENGTH = 0x1000 |

Referring now to Table 4, shown is an exemplary hint message (i.e. information carried by a hint packet) corresponding to Table 3, i.e. based on the work elements of Table 3. As shown, rows 1 and 2 of Table 4 include memory details and operation indication (or type), required for accomplishing RDMA operations based on the work elements.

TABLE 4

| | |
|---|---|
| Tagged Ops (READ/WRITE) Memory Ranges: (R_Key, start, length, type) | (30, 0x1000, 0x8000, READ) (40, 0x100000, 0x3000, WRITE) |
| Untagged Ops (SEND) | SEND sequence ID 3, total sends count 4 |

The controller 104 is configured to transmit the hint message to the responding device over the communication interface 106, and the responding device corresponds to the responder of the at least one work element of the retrieved one or more work elements. As mentioned herein above, each work element indicates a responder, the responding device corresponds to the designated responder of the at least one work element of the retrieved one or more work elements. In other words, based on the responder details carried by the retrieved one or more work elements the controller 104 would transmit such work elements to the corresponding or designated responders. For example, the responder details may include the target memory address of the responder or responding device, for allowing transmission of the work elements accordingly from the controller 104.

In an embodiment, one or more work elements of the retrieved one or more work elements are for a first responder and one or more work elements of the retrieved one or more work elements are for a second responder. Further, the controller 104 is further configured to generate the hint message and transmit the hint message to the corresponding responding device by generating a first hint message and transmitting the first hint message to a first responding device corresponding to the first responder and generating a second hint message and transmitting the second hint message to a second responding device corresponding to the second responder. Herein, each of the first hint message and the second hint message are transmitted to their respective responding devices (i.e. the first responding device and the second responding device) individually before the actual transmission of the one or more work elements to their respective responders based on the responder's details. In other words, a single requesting device, such as the requesting device 100, is stated to have RDMA communications with multiple responders, i.e. by segregating the retrieved work elements based on their responder details.

In another embodiment, one or more work elements of the retrieved one or more work elements are related to a first requestor (such as the requesting device 100) and one or more work elements of the retrieved one or more work elements are related to a second requestor (such as another requesting device 100). In other words, multiple requesting devices, such as two or more requesting devices 100, is stated to have RDMA communications with a single or common responder. As explained herein above, each of the work element indicates a requestor, the one or more work elements of the retrieved one or more work elements can be segregated based on the indication of the requestors, which in turn depends on the number of the requestors. Consequently, the responding device receives the hint messages from each of the first and second requesting devices before the actual transmission of the one or more work elements from the first and second requesting devices to the common responder. Similarly, multiple requesting devices, such as two or more requesting device 100, is stated to have RDMA communications with multiple responders.

According to various embodiment of the present disclosure, the hint messages may be implemented (for example generated and transmitted) in various manner. In an example, the hint message may be implemented with a new header added to existing packets to transport the hints (i.e. mainly indication of operations), instead of a new BTH operation code. Alternatively, the hint message may be implemented may be carried as additional payload in existing packets. Further, instead of a BTH operation code, existing operation code may be used with special flags (e.g., '0-sized READ/WRITE). Moreover, the hint message may be implemented via new BTH operation code.

In an embodiment, the hint messages may be activated explicitly at the application layer (for example, a new InfiniBand Verb). The hint message may be negotiated between the requesting device 100 and the responder (i.e., the responder "solicits" the usage of the indication of the operations and their type from the requester depending on its local state). For example, if non-pinned memory is not used at the responder, prefetching hints may be unnecessary.

In another embodiment, the hint message generation may be controlled by the RNIC FW (RDMA Network Interface Card Firmware).

Optionally, the requesting device 100 may be configured to use a special QP to transmit the hint messages for all QPs to the same responder. Otherwise, the requesting device 100 may use an unreliable Datagram (UD) QP to multicast the hint message to all QPs, even when they are over responders at different hosts. Other QP types are reliable connected (RC) and unreliable connected (UC). The UD QP may be limited only to QPs within a given user application (for security and isolation considerations), or it may be a global per-device QP, managed by a single trusted entity (e.g., Physical Function).

According to an embodiment, the processing of the hints at the responder can be divided between the RNIC HW (RDMA Network Interface Card Hardware), the RNIC FW (RDMA Network Interface Card Firmware), the System MMU/IOMMU (Memory Management Unit/Input/Output Memory Management Unit) HW, device driver, OS kernel, or hypervisor such as VM/VMM (Virtual Machine/Virtual Machine Manager).

According to one embodiment, the controller 104 is further configured to transmit a request relating to the operation of at least one work element of the retrieved one or more work elements to the responding device over the communication interface 106, the request indicating the operation. The request is sent to the responding device indicating the operation to be performed and for seeking permission from the responding device to perform the operation. In other words, the request is a remote direct memory (RDMA) access request from the requesting device 100 to the responding device for performing RDMA operations relating to (or associated with) the operation of at least one work element of the retrieved one or more work elements. It is to be understood that, the controller 104 is configured to initially transmit the hint message to the responding device, and thereafter the request. Accordingly, the responding device is initially updated about the possible operations that need to be carried out by the responding device based on the "hint message", i.e. indication of the operation of at least one work element of the retrieved one or more work elements. This allows the responding device to sort required corresponding or complementally operations at the responding device end. Thereafter, the controller 104 transmits or sends "the request" to look for the permission from the responding device to carry out the possible requested operations based on the work elements.

In another embodiment, the request relates to a storage operation. The requesting device 100 transmitting the request relating to a storage operation of the one or more work elements 108 stored in the one or more requesting queues. In other words, the requesting device 100 seeks permission from the responding device 100 to store via transmitting the one or more work elements 108 in the responding device (or in the cache memory) to further enable the responding device to execute the at least one operation.

In yet another embodiment, the request relates to an Artificial Intelligence operation. The request relates to an artificial intelligence operation including, but not limited to, machine learning applications based on pre-trained and customised deep neural networks, which require complex computations, fast and efficient data delivery. In an example, the request is for enabling smart offloading via RDMA operation and suitable hardware and In-Network computing capabilities that dramatically improve neural network training performance and overall machine learning applications. In another example, InfiniBand and Ethernet (such as RoCE) networking solutions for a complete, high-performance artificial intelligence infrastructure.

In another embodiment, the requesting device 100 is arranged for High-performance computing (HPC). In other words, the requesting device 100 is configured for executing software applications and operations using HPC techniques. The requesting device 100 provides users with HPC functionality dynamically allocated among various computing devices (such as the responding device) with I/O performance substantially similar to the processing performance. The requesting device 100 may be a standalone computing environment or any other suitable environment. The requesting device 100 may be arranged for any HPC computing environment that includes highly computing nodes and allows the execution of operations on the work elements or data packets. The term "dynamically," as used herein, generally means that certain processing is determined, at least in part, at run-time based on one or more variables. The term "automatically", as used herein, generally means that the appropriate processing is substantially performed by at least part of requesting device 100. It should be understood that "automatically" further contemplates any suitable device with the requesting device 100 without departing from the scope of this disclosure.

In another embodiment, The request transmitted by the requesting device 100 relates to a remote procedure call (RPC) i.e. when the requesting device 100 causes an operation or procedure (or subroutine) to be executed in a different address space (or target memory address), without the need of explicit coding of the details for the remote interaction. This is a form of client—server interaction (requestor is client, executor or responder is server), typically implemented via a request—response message-passing system. Notably, The RPC model implies a level of location transparency, namely that the calling procedures may or may not be different, enabling to distinguish between a local or a remote call, that are usually orders of magnitude slower and less reliable than local calls, making said distinguishing important. The RPCs are a form of inter-process communication (IPC), wherein different operations are related to different address spaces. In an example, if present on the same host machine (such as the requesting device 100), said operations entail distinct virtual address spaces, even though the physical address space is the same; In another example, if present on different hosts or host machines, the physical address space is also different.

In an embodiment, the controller 104 is further configured to receive a confirmation message from the responding device prior to transmitting the request relating to the operation. The responding device provides the confirmation message as a response (or reply) to the hint message to the requesting device 100. Typically, the responding device is configured to provide a confirmation message (or an acknowledgement message), indicating that the hint message was processed, and the requesting device 100 is ready and capable for performing the requested operations indicated by the hint message. Notably, the acknowledgement message may be a positive acknowledgment (ACK) message indicating that the hint message was processed successfully or a negative acknowledgement (NAK) message indicating a rejection relating to processing of the hint message or to indicate some errors or incapability of the responding device.

Optionally, the requesting device 100 is configured to wait a pre-defined amount of time depending upon the agreement between the requesting device 100 and the responding device. The pre-defined amount of time is dependent upon the hint message, the type of hint message, capabilities of the responding device and the like. The programming of the pre-defined amount (or time interval) between transmission of various work elements enable reliable data communication and reduced latency which in turn speed up the data communication for the RDMA operations. The requesting device 100 of the present disclosure further comprises software modules 110. The software modules 110 may be stored in the memory 102 of the requesting device 100. The one or more software modules 110 include a work element storing module 112, a work element retrieval module 114, a hint message generation module 116, a hint message transmission module 118, and a request transmission module 120. The work element storing module 112 is for storing a plurality of work elements 108 in one or more requesting queues in the memory 102. The work element retrieval module 114 is for retrieving at least one of the work elements from the memory 102. The hint message generation module 116 is for generating a hint message, which comprises an indication of at least one operation of a corresponding at least one work element of the retrieved one or more work elements. The hint message transmission module 118 is for transmitting the hint message to the responding device over the communication interface 106, the responding device corresponding to the responder of the at least one work element of the retrieved one or more work elements. The request transmission module 120 for transmitting a request relating to the operation of at least one work element of the retrieved one or more work elements to the responding device over the communication interface 106, and the request indicating the operation.

Figure 2:
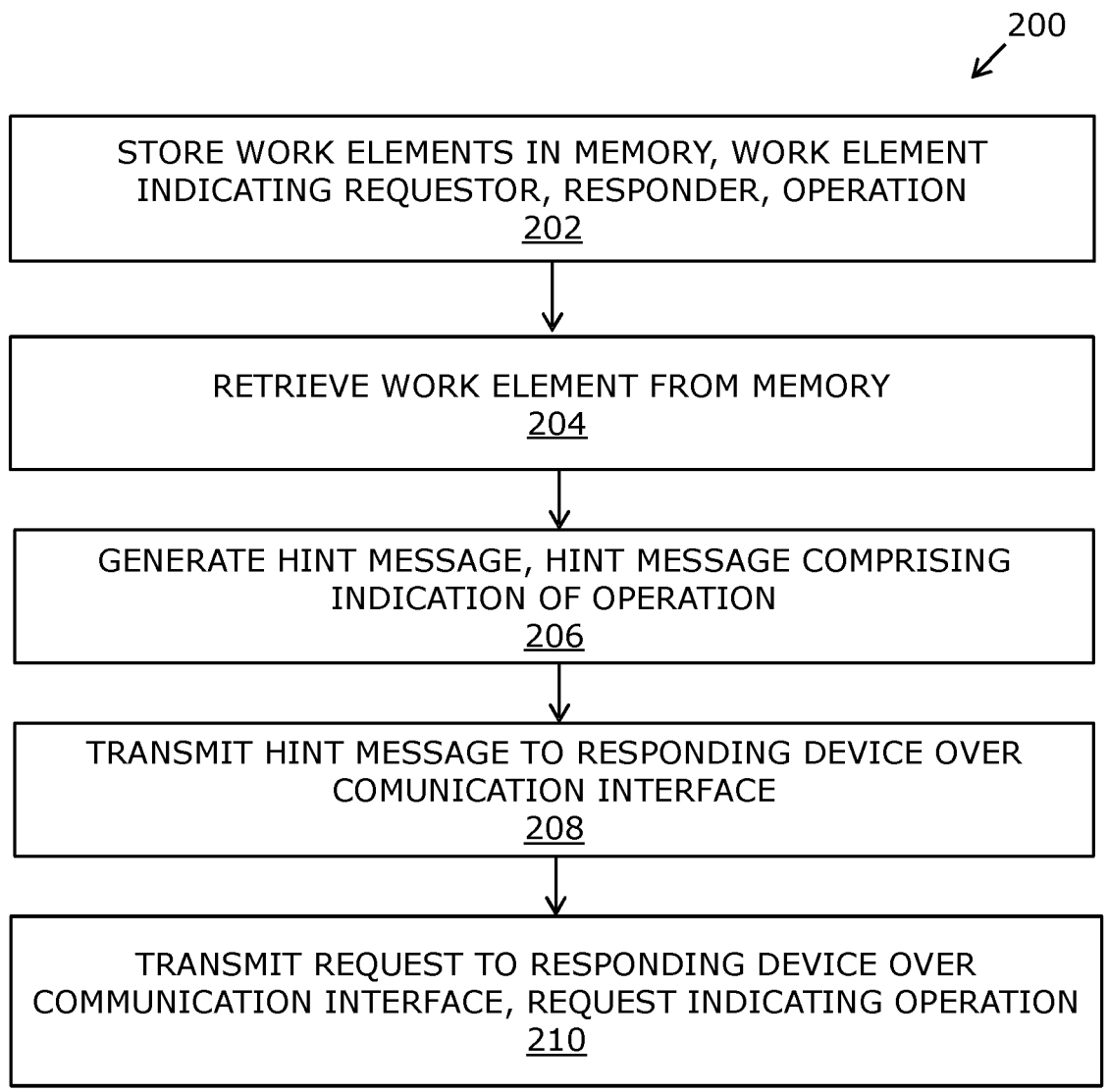
FIG. 2 is a flowchart of a method for a requesting device for performing a RDMA operation, in accordance with an embodiment of the present disclosure.

Referring now to FIG. 2, illustrated is a flowchart of a method 200 for a requesting device 100 for performing a RDMA operation, in accordance with an embodiment of the present disclosure. The FIG. 2 should be read in conjunction with FIG. 1. For example, the method 200 is executable by the controller 104 of the requesting device 100 which is shown and explained in conjunction with FIG. 1. As shown, the method 200 for the requesting device, such as the requesting device 100, includes steps 202-210.

At step 202, the method 200 comprises storing a plurality of work elements in one or more requesting queues in a memory (such as the memory 102 of FIG. 1). Each work element indicating a requestor (such as the requesting device 100), a responder (or a responding device) and an operation. The plurality of work elements is stored in the memory 102 of the requesting device 100 by a controller (such as the controller 104) for further implementation.

At step 204, the method 200 comprises retrieving at least one of the work elements from the memory 102. The at least one of the work elements of the plurality of work elements 108 is retrieved by the controller 104 of the requesting device 100.

At step 206, the method 200 comprises generating a hint message, the hint message comprising an indication of at least one operation of a corresponding at least one work element of the retrieved one or more work elements. The hint message is generated by the controller 104 of the requesting device 100 to initiate the remote direct memory access operation with another computing device (i.e. a responding device). The hint message indicates the operation (or the operation type) associated to the at least one work element such as a read operation, write operation, send operation or an atomic operation.

At step 208, the method 200 comprises transmitting the hint message to the responding device over the communication interface 106. The responding device corresponds to the responder of the at least one work element of the retrieved one or more work elements. The hint message is transmitted by the controller 104 of the requesting device 100 over the communication interface 106 to the responding device. The responding device performs the operation according to the hint message.

At step 210, the method 200 comprises transmitting a request relating to the operation of at least one work element of the retrieved one or more work elements to the responding device over the communication interface 106, the request indicating the operation. The request is transmitted by the controller 104 of the requesting device 100 over the communication interface 106 to the responding device.

The steps 202 and 210 are only illustrative and other alternatives can also be provided where one or more steps are added, one or more steps are removed, or one or more steps are provided in a different sequence without departing from the scope of the claims herein.

The present disclosure also provides a computer program product comprising a non-transitory computer-readable storage medium having computer program code stored thereon, the computer program code being executable by a processor to execute the method 200. Typically, the method 200 is for a requesting device (such as the requesting device 100, shown and explained in conjunction with FIG. 1) to communicate with a responding device for carrying out RDMA operations based on hint messages. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Figure 3:
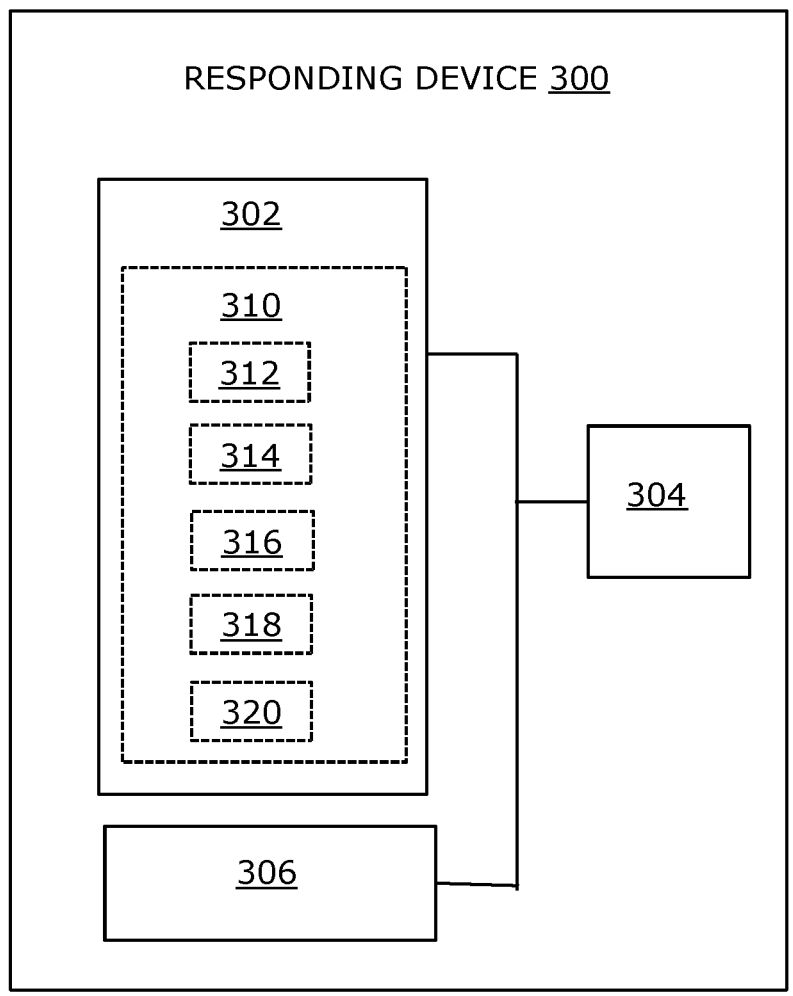
FIG. 3 is block diagram of a responding device operable to perform a RDMA operation, in accordance with an embodiment of the present disclosure.

Referring now to FIG. 3, illustrated is a block diagram of a responding device 300 operable to perform a RDMA operation, in accordance with an embodiment of the present disclosure. The responding device 300 should be read in conjunction with the requesting device 100 of the FIG. 1. Typically, the responding device 300 communicates with the requesting device 100 for carrying out RDMA operations based on hint messages.

As shown, the responding device 300 comprises a memory 302, a controller 304 and a communication interface 306. The memory 302 and the communication interface 306 are similar to the memory 102 and the communication interface 106 of the requesting device 100 of FIG. 1, and therefor explanation thereof is avoided do the sake of brevity.

The controller 304 includes suitable logic, circuitry, and/or interfaces that is configured to receive a hint message from a requesting device (such as the requesting device 100) over the communication interface 306, the hint message indicating at least one operation. The controller 304 is a computational element that is configured to process the instructions that drive the responding device 300. Examples of the controller 304 includes, but are not limited to, a network interface controller, a microprocessor, a microcontroller, a complex instruction set computing (CISC) microprocessor, a reduced instruction set (RISC) microprocessor or a very long instruction word (VLIW) microprocessor. Optionally, one or more controllers similar to the controller 304, processing devices and elements may be arranged in various architectures for responding to and processing the instructions that drive the responding device 300.

In operation, the controller 304 is configured to receive a hint message from the requesting device 100 over the communication interface 306. The hint message comprising an indication of at least one operation. The hint message includes an indication of at least one operation such as a read operation, a write operation, a send operation or an atomic operation. The hint message is transmitted in the form of one or more data packets. The data packet of the hint message comprises a packet sequence number (PSN) to enforce correct order of the hint message. The hint message also comprises source and destination queue pair (QP) numbers. The hint message further comprises the memory address for the read, write and atomic operations. The first message further comprises an operation type and an operand data.

The controller 304 is further configured to determine a pre-emptive action based on the indication of the at least one operation. The hint message comprises the indication of the at least one operation based on which the controller 304 is configured to determine a pre-emptive action (or a preparatory action) to be followed by the responding device 300. The pre-emptive action is an operation performed by the responding device 300 to prepare the memory area (e.g. local memory buffers) prior to receiving a request for the Remote Direct Memory Access operation. The pre-emptive action includes at least one of a prefetch operation, a cache warm-up operation, an atomic operation. The pre-emptive actions correspond to the hint messages (transmitted by the requesting device 100) received by the responding device 300. For example, the hint message may be one of a prefetch hint message, a cache warm-up hint message, an atomic hint message, which is explained herein above in conjunction with the requesting device 100 of FIG. 1. For example, when a non-pinned Remote Direct Memory Access system is used, the requesting device 100 sends a prefetch hint message as the hint message to the responding device 300. The hint message (or the prefetch hint) gives time to the responding device 300 to prepare its memory areas (i.e. the local memory buffers) before the actual request of the Remote Direct Memory Access operation targeting the memory areas (i.e. the local memory buffers) arrives.

The controller 304 is further configured to execute the pre-emptive action including at least one of a prefetch operation, a cache warm-up operation, an atomic operation. The controller 104 is configured to execute the pre-emptive action to prepare the memory area (e.g. local memory buffers) prior to receiving a request for the Remote Direct Memory Access operation based on the hint message.

The controller 304 is further configured to receive a request relating to the at least one operation from the requesting device 100 over the communication interface 306, the request indicating at least one of the at least one operation. Typically, the request is a remote direct memory (RDMA) access request from the requesting device 100 to the responding device 300 to perform the RDMA operation. The request is sent by the requesting device 100 to the responding device 300 for seeking permission from the responding device 300 to perform the operation based on the hint message.

The controller 304 is further configured to execute the at least one of the at least one operation. The at least one of the at least one operation is selected from the operations including, but not limited to, a RDMA read operation, a RDMA write operation, a send operation, or an atomic operation. Typically, the at least one of the at least one operation is based on the indication of the operation(s) of the hint message.

In an embodiment, the operation relates to a memory area and wherein the controller 304 is further configured to determine the pre-emptive action based on the memory area and the operation. The hint message includes indication of the at least one operation and the memory area related to the at least one operation to determine the pre-emptive action to be performed prior to executing the operation. The controller 304 based on the memory area and operation determines the pre-emptive action including at least one of a prefetch operation, a cache warm-up operation, an atomic operation in an effort to prepare the memory area (e.g. local memory buffers) prior to receiving a request for the Remote Direct Memory Access operation. Further, the controller 304 is configured to execute the pre-emptive action by determining if a loading of the memory area is required, and if so, loading the memory area into the memory. The controller 304 determines whether the memory area related to the operation requires to be loaded (or populated) or not and loads the memory area if a requirement is present to execute pre-emptive action.

In another embodiment, the controller 304 is further configured to transmit a confirmation message to the requesting device 100. The confirmation message indicating whether the pre-emptive action was successful or not. The responding device 300 is configured to provide a confirmation message (or an acknowledgement message) indicating whether the pre-emptive action was successful or not. Consequently, whether the responding device 300 is ready to receive the incoming data packets from the requesting device 100 (i.e. to allow successful transfer of the data packets form the requesting device 100 to the responding device 300). The responding device 300 provides the confirmation message as a response (or reply) to the hint message to the requesting device 100 indicating the status of the pre-emptive action. Notably, the confirmation message may be a positive acknowledgment (ACK) message indicating that the pre-emptive action was executed successfully and the memory area is prepared, or a negative acknowledgement (NAK) message indicating the pre-emptive action is not executed successfully and the memory area is not prepared for receiving the incoming data packets.

In operation (or at implementation level), the responding device 300 is configured to perform a plurality of actions upon receiving the hint message. Typically, actions include but not limited to determining the relevant QP number (from packet header) and ensure the QP context is in the RNIC cache, determine the relevant DMA target and issue DMA requests to the memory 302, and to perform ATOMIC operations. Further, based on the present disclosure the responding device 300 upon receiving the hint message performs the following actions: request contexts for QPs to be brought into the cache of the responding device 300, immediately sends memory page requests for each of the ranges with appropriate attributes (not waiting for request packets to arrive from the requesting device 100), fetches the ATOMIC operation original data from the memory 302, and optionally send an acknowledgement (or confirmation) that the hints were processed. The confirmation message received from the responding device allows the requesting device 100 to adapt or configure the transmission of the data packets, accordingly, aiding to a fault free operation. Typically, the confirmation message implies that the first message is successfully transmitted to the receiving device. The controller 304 upon receiving the confirmation message transmits the request relating to the operation regardless of any external factor. The acknowledgement message reduces the total execution time of the data transfer and improves the latency. The improved latency indicative of data communication at a higher speed.

The responding device 300 of the present disclosure further comprises software modules 310. The software modules 310 may be stored in the memory 302 of the responding device 300. The software modules 310 includes a hint message receiving module 312, a pre-emptive action determination module 314, a pre-emptive action execution module 316, a request receiving module 318 and an operation execution module 320.

The hint message receiving module 312 is for receiving a hint message from the requesting device 100, the hint message comprising an indication of at least one operation. The hint message receiving module receives the hint message from the requesting device 100 to employ the information from the hint message to further determine the pre-emptive action. The pre-emptive action determination module 314 is for determining a pre-emptive action based on the indication of the at least one operation. Upon receiving the hint message, the pre-emptive action determination module determines the pre-emptive action based on the information provided by the hint message. The pre-emptive action execution module 316 is for executing the pre-emptive action and prepare the memory area associated with the at least one operation by virtue of the pre-emptive action including, but not limited to, prefetch operation, cache warmup and so forth. The request receiving module 318 is for receiving a request relating to the at least one operation from the requesting device 100, the request indicating at least one of the at least one the operation. Upon determining the pre-emptive action and preparation of the memory area associated with the at least one operation, the request receiving module receives a request from the requesting device 100 relating to the at least one operation, in other words requesting access to the associated memory area to perform the at least one operation. The operation execution module 320 is for executing the at least one of the at least one operation. Upon receiving the request from the requesting device 100, the operation execution module is operable to execute the at least one operation on the associated memory area.

Figure 4:
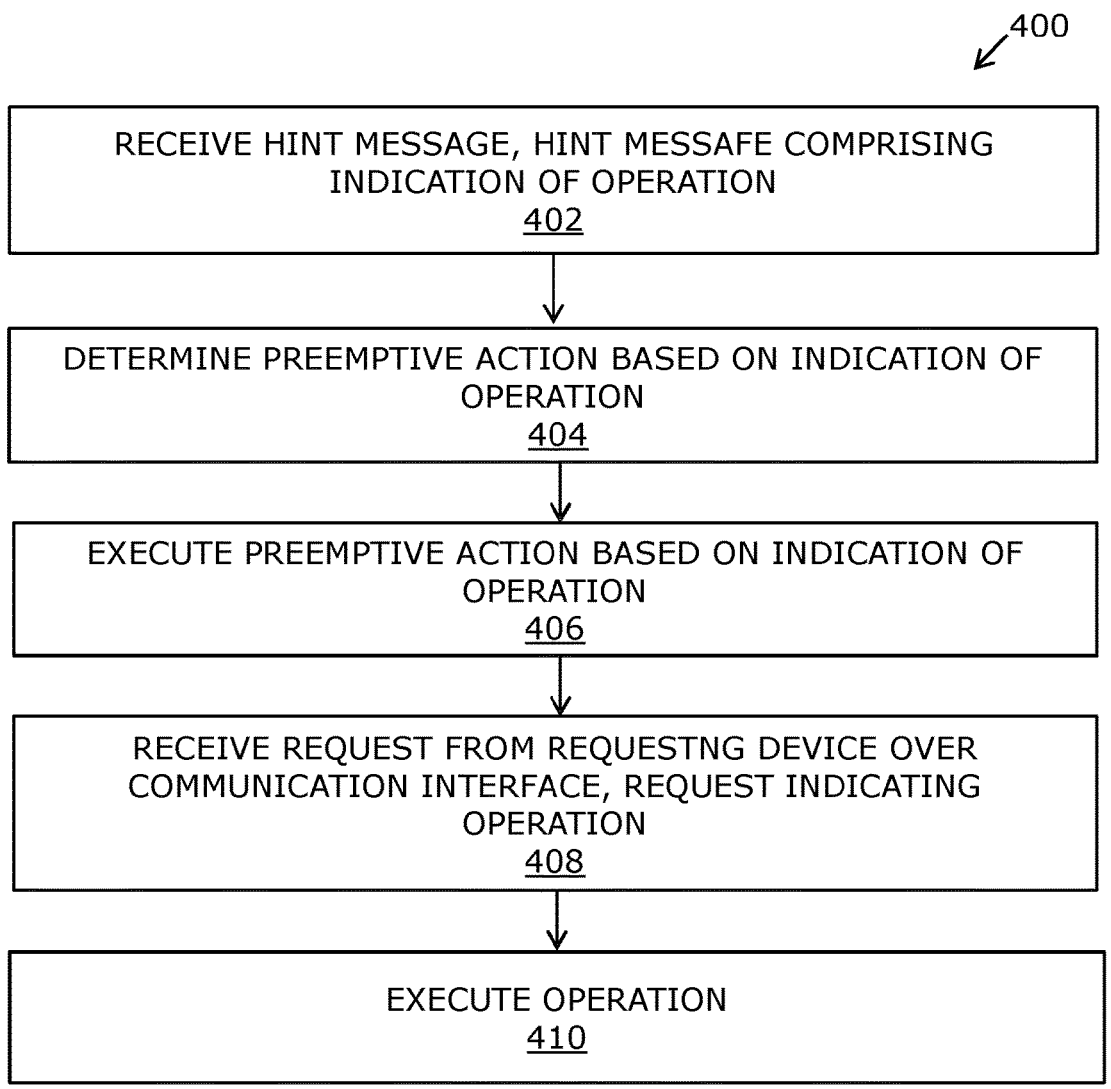
FIG. 4 is a flowchart of a method for a responding device performing for a RDMA operation, in accordance with an embodiment of the present disclosure.

Referring now to FIG. 4, illustrated is a flowchart of a method 400 for a responding device for performing a RDMA operation, in accordance with an embodiment of the present disclosure. The FIG. 4 should be read in conjunction with FIGS. 1-3. For example, the method 400 is executable by the controller 304 of the responding device 300, which is shown and explained in conjunction with FIG. 3. Further, the responding device 300 is in communication with the requesting device 100, which is shown and explained in conjunction with FIGS. 1 and 2. As shown, the method 400 for the responding device includes steps 402-410.

At step 402, the method 400 comprises receiving a hint message, the hint message comprising an indication of at least one operation. The hint message indicates the operation (or the operation type) such as a read operation, write operation, send operation or an atomic operation.

At step 404, the method 400 comprises determining a pre-emptive action based on the indication of the at least one operation. Typically, the hint message comprises the indication of the at least one operation, based on which the controller 304 is configured to determine a pre-emptive action to be followed by the responding device 300. The pre-emptive action is an operation performed by the responding device 300 to prepare the memory area (e.g. local memory buffers) prior to receiving a request for the Remote Direct Memory Access operation. The pre-emptive action includes at least one of a prefetch operation, a cache warm-up operation, an atomic operation.

At step 406, the method 400 comprises executing the pre-emptive action using the controller 304 of the responding device 300. Upon determining the pre-emptive action, the controller is configured to execute the pre-emptive action to prepare the memory area (e.g. local memory buffers) prior to receiving a request for the Remote Direct Memory Access operation.

At step 408, the method 400 comprises receiving a request relating to the at least one operation from the requesting device 100, the request indicating at least one of the at least one operation. The request is sent by the requesting device 100 to the responding device 300 over the communication interface 306 indicating the at least one operation to be performed and for seeking permission from the responding device 300 to perform the at least one of the at least one operation. In an example, the request is a remote direct memory (RDMA) access request from the requesting device 100 to the responding device 300 to perform the RDMA operation(s).

At a step 410, the method 400 comprises executing the at least one of the at least one operation. The at least one of the at least one operation is selected from the plurality of operations including, but not limited to, a RDMA read operation, a RDMA write operation, a send operation, or an atomic operation and executed by the controller of the responding device 300.

The steps 402 and 410 are only illustrative and other alternatives can also be provided where one or more steps are added, one or more steps are removed, or one or more steps are provided in a different sequence without departing from the scope of the claims herein.

The present disclosure also provides a computer program product comprising a non-transitory computer-readable storage medium having computer program code stored thereon, the computer program code being executable by a processor to execute the method 400. Typically, the method 400 is for a responding device (such as the responding device 300, shown and explained in conjunction with FIG. 3) to communicate with a requesting device 100 for carrying out RDMA operations based on hint messages. Examples of implementation of the non-transitory computer-readable storage medium include, but is not limited to, Electrically Erasable Programmable Read-Only Memory (EEPROM), Random Access Memory (RAM), Read Only Memory (ROM), Hard Disk Drive (HDD), Flash memory, a Secure Digital (SD) card, Solid-State Drive (SSD), a computer readable storage medium, and/or CPU cache memory. A computer readable storage medium for providing a non-transient memory may include, but is not limited to, an electronic storage device, a magnetic storage device, an optical storage device, an electromagnetic storage device, a semiconductor storage device, or any suitable combination of the foregoing.

Figure 5:
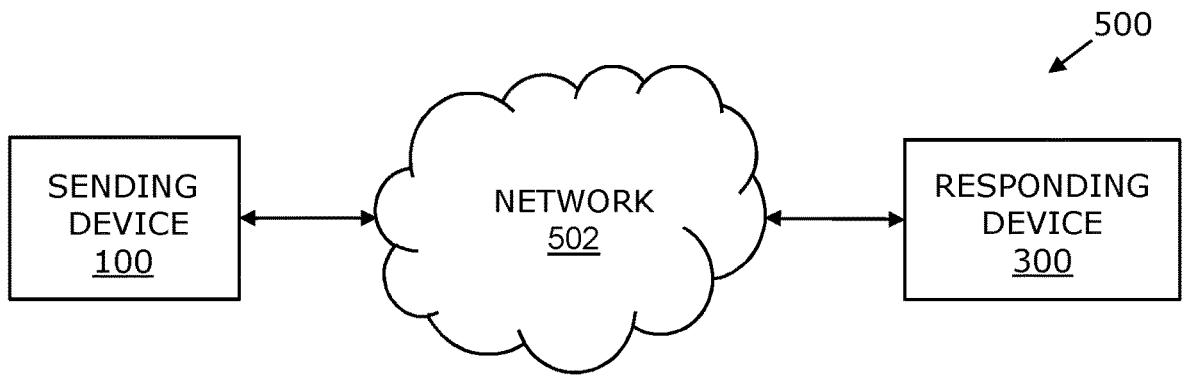
FIG. 5 is block diagram of a RDMA system having a requesting device and a responding device, in accordance with an embodiment of the present disclosure.

Referring now to FIG. 5, illustrated is a block diagram of a RDMA system 500 having a requesting device 100 and a responding device 300, in accordance with an embodiment of the present disclosure. The FIG. 5 should be read in conjunction with elements from FIGS. 1-4. The RDMA system 500 includes the requesting device, such as the requesting device 100 (shown and explained in conjunction with FIGS. 1 and 2), and a responding device, such as the responding device 300 (shown and explained in conjunction with FIGS. 3 and 4). As shown, the system 500 includes the requesting device 100 and the responding device 300 communicably coupled to the requesting device 100 via a communication network 502.

In an embodiment, the communication network 502 may be a computer cluster, a Local Area Communication channel (LAN), a cellular communication channel, a wireless sensor communication channel (WSN), a cloud communication channel, a vehicle-to-communication channel (V2N) communication channel, a Metropolitan Area Communication channel (MAN), and/or the Internet. Further, the communication network 502 should be in accordance with various communication channel protocols, which support RDMA communications. Examples of such communication channel protocols, communication standards, and technologies may include, but are not limited to, InfiniBand (IB), RDMA over converged Ethernet (RoCE), internet wide area RDMA protocol (iWARP), or modifications and variations thereof.

In the RDMA system 500, the requesting device 100 can directly access a memory of the responding device 300 without involving operating system (OS) of the requesting device 100 and the responding device 300. Further, the requesting device 100 communicates (exchange data) with the responding device 300 based on a hint message, which may include at least one of a memory prefetch hints, cache warm-up hints, and atomic operation hints. The RDMA system 500 do not support sharing the requesting device 100 knowledge of RDMA targets with the responding device 300. Typically, in the RDMA system 500, sending multiple hints from the requesting device 100 at once allows the responding device 300 to optimize various aspects, such as: memory prefetching, cache warm-up, offloading multiple atomic operations into the hardware and so forth. Moreover, in the remote direct memory access (RDMA) system 500, data is transferred directly without being copied between communication channel layers (or network layers) of the communication interfaces 106, 306 in the requesting device 100 and the responding device 300. The data is transferred, for example, in the form of one or more data packets in the remote direct memory access system 500. The data packet comprises information related to the packet sequence number (PSN) to enforce correct packet ordering. The data packet further comprises source and destination queue pair (QP) numbers, which distinguish an application and memory regions for the application. In one embodiment, the memory region has a memory key (R-key) that is part of the data packet, which associates the memory region with the applicant, and vice-versa. The data packet further comprises information related to a message type (such as a RDMA READ, a RDMA WRITE, a SEND, or an ATOMIC) and parameters of the message such as (a message length, a target memory address, an operation type and an operand data).

Figure 6:
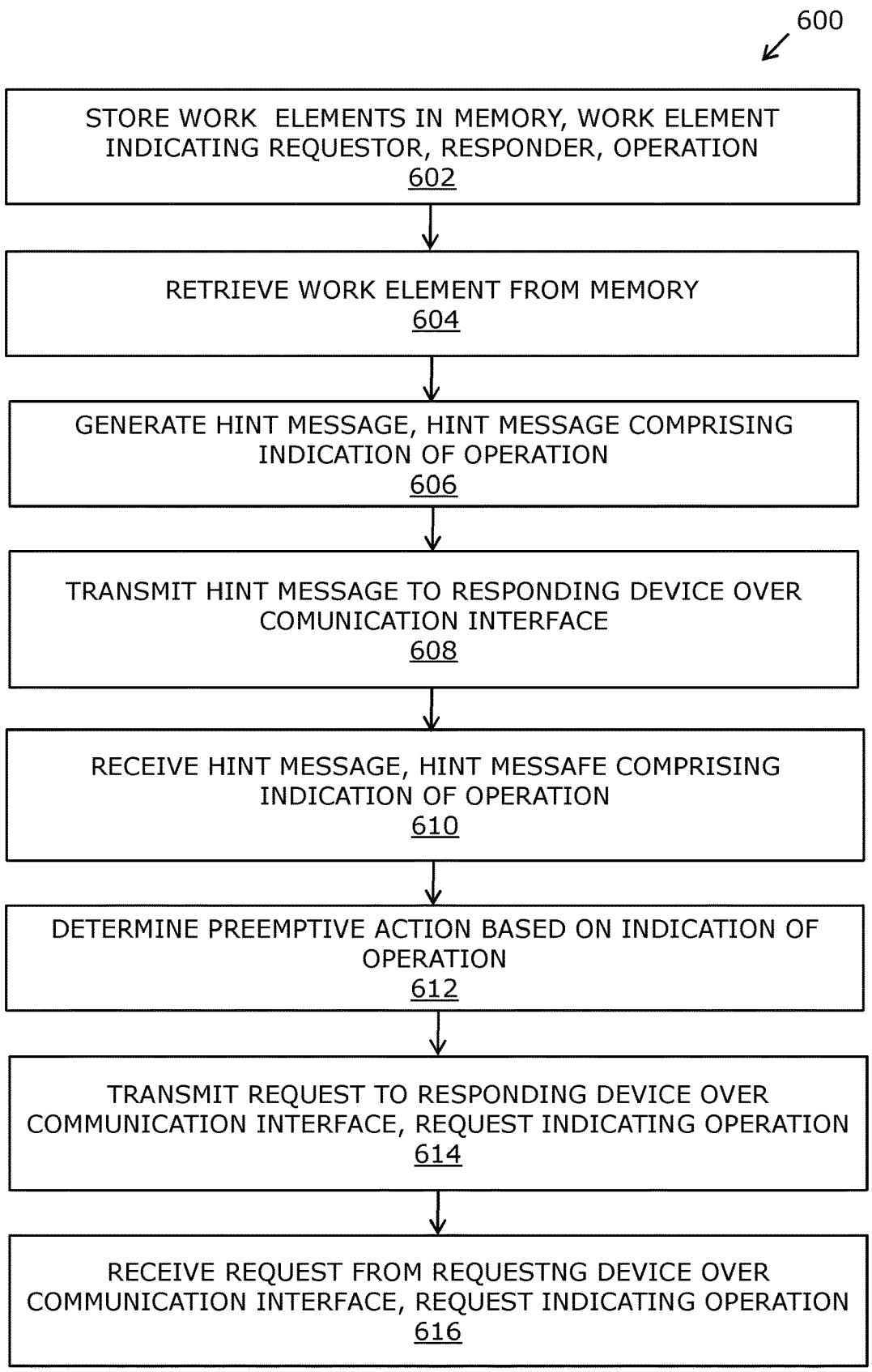
FIG. 6 illustrated is a flowchart of a method for a system comprising a responding device and a requesting device for performing a RDMA operation.

Referring now to FIG. 6, illustrated is a flowchart of a method 600 for a system comprising a responding device and a requesting device for performing a RDMA operation, in accordance with an embodiment of the present disclosure. The FIG. 6 should be read in conjunction with the FIG. 5, which relates to the RDMA system 500 having a responding device and a requesting device. Further, the FIG. 5 should be read in conjunction with elements from FIGS. 1-4. The RDMA system 500 includes the requesting device, such as the requesting device 100 (shown and explained in conjunction with FIGS. 1 and 2), and a responding device, such as the requesting device 300 (shown and explained in conjunction with FIGS. 3 and 4). The method 600 includes steps 602 to 614.

At a step 602, the method 600 comprises storing a plurality of work elements by the requesting device 100 in one or more requesting queues in the memory 102. Each work element indicates a requestor, a responder and an operation.

At a step 604, the method 600 comprises retrieving at least one of the work elements by the requesting device 100. The at least one of the work elements is retrieved from the plurality of work elements by the controller 104 from the memory 102 of the requesting device 100.

At a step 606, the method 600 comprises generating a hint message, the hint message comprising an indication of at least one operation of a corresponding at least one work element of the retrieved one or more work elements. The hint message is generated by the controller 104 of the requesting device 100 to initiate the remote direct memory access operation with the responding device 300. The hint message indicates the operation (or the operation type) associated to the at least one work element such as a read operation, write operation, send operation or an atomic operation.

At a step 608, the method 600 comprises transmitting by the requesting device 100, the hint message to the responding device 300 over a communication interface 306. The responding device 300 corresponding to the responder of the at least one work element of the retrieved one or more work elements. The hint message is transmitted by the controller 104 of the requesting device 100 over the communication interface 106 to the responding device 300.

At a step 610, the method 600 comprises receiving a hint message by the responding device from the requesting device 100, the hint message comprising an indication of at least one operation. The controller 304 of the responding device 300 is configured to receive the hint message. The hint message includes an indication of at least one operation such as a read operation, a write operation, a send operation or an atomic operation. The hint message is transmitted in the form of one or more data packets. The data packet of the hint message comprises a packet sequence number (PSN) to enforce correct order of the hint message. The hint message also comprises source and destination queue pair (QP) numbers. The hint message further comprises the memory address for the read, write and atomic operations. The hint message further comprises an operand data relating to the one or more objects on which the operation is to be performed.

At a step 612, the method 600 comprises the responding device 300 determining a pre-emptive action based on the indication of the at least one operation and executing the pre-emptive action. The controller 304 of the responding device 300 is configured to determine the pre-emptive action based on the indication of the at least one operation of the hint message. The pre-emptive action is an operation performed by the responding device 300 to prepare the memory area (e.g. local memory buffers) prior to receiving a request for the Remote Direct Memory Access operation. The pre-emptive action includes at least one of a prefetch operation, a cache warm-up operation, an atomic operation.

At a step 614, the method 600 comprises transmitting a request by the requesting device 100 relating to the operation to the responding device 300. The request indicating the operation and the memory area.

At a step 616, the method 600 comprises the responding device 300 receiving a request relating to the at least one operation from the requesting device 100, the request indicating at least one of the at least one operation and executing the operation. The request is sent by the requesting device 100 to the responding device 300 indicating the at least one operation to be performed and for seeking permission from the responding device 300 to perform the operation. The request also includes executing the operation.

Figure 7:
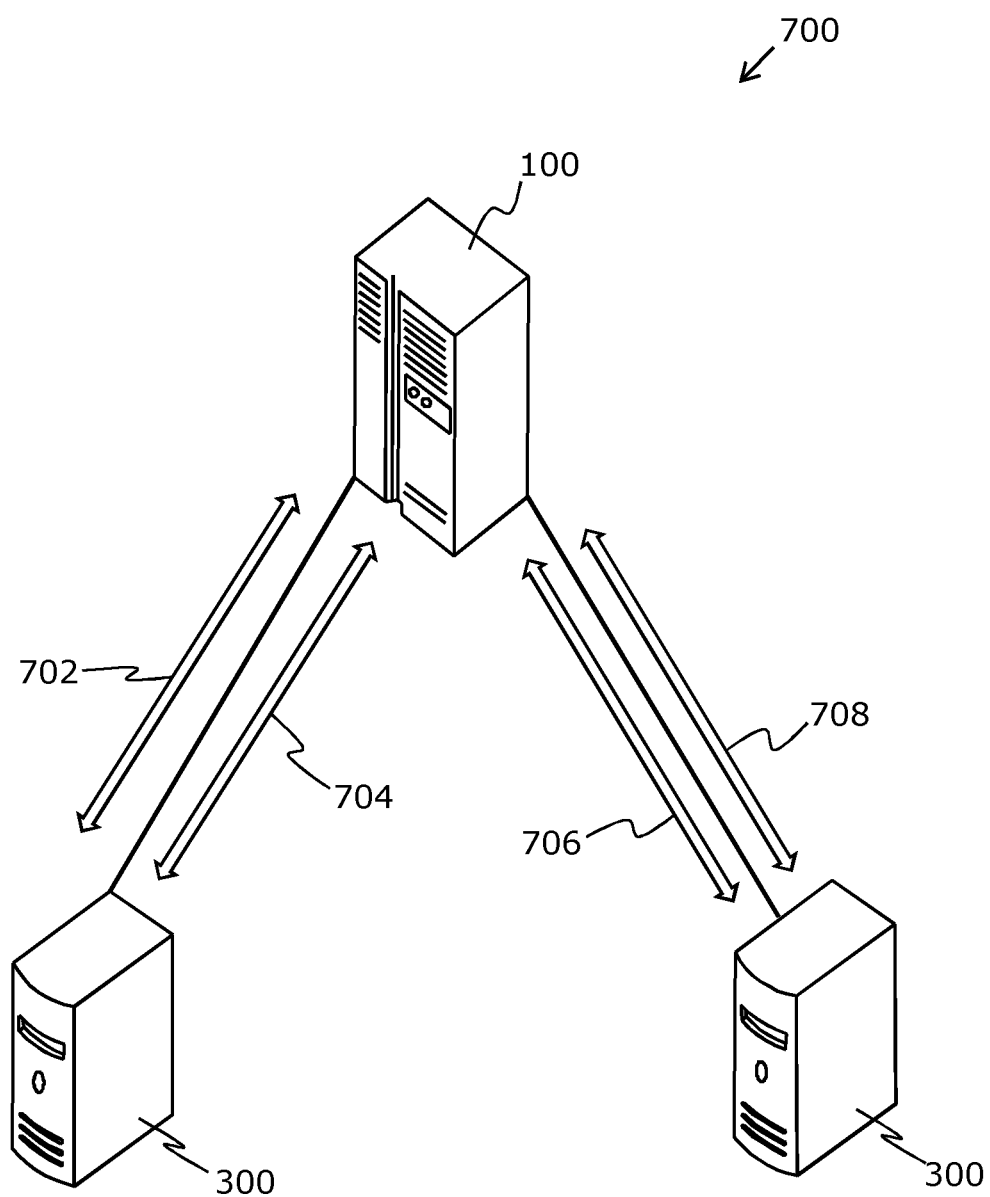
FIGS. 7-9 are schematic diagrams depicting exemplary scenarios of implementations of RDMA systems, in accordance with various embodiment of the present disclosure.
Figure 8:
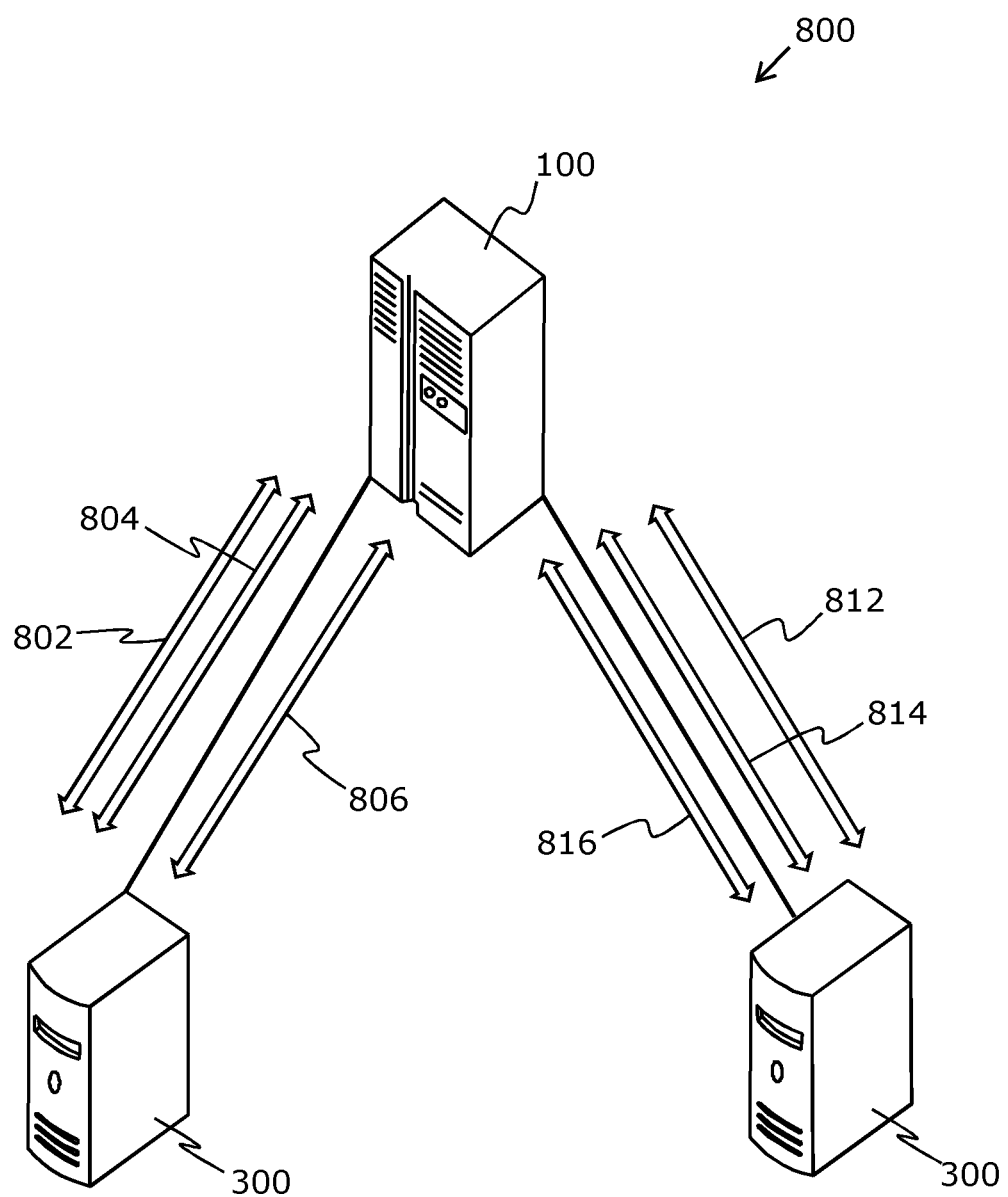
Figure 9:
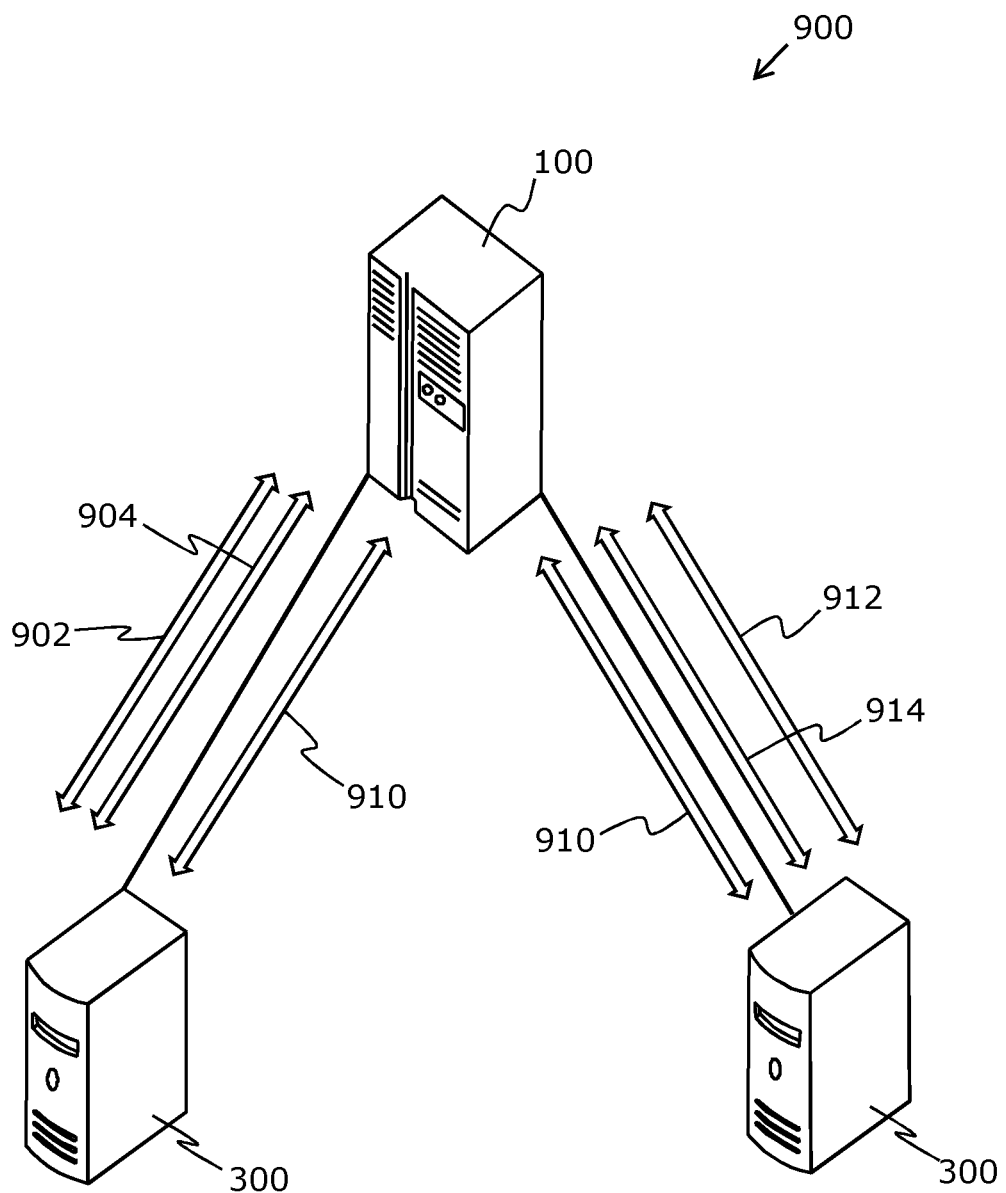

Referring now to FIGS. 7-9 illustrated are schematic diagrams depicting exemplary scenarios of implementations of RDMA systems 700, 800 and 900, in accordance with various embodiment of the present disclosure. The RDMA systems 700, 800, 900 are similar to the RDMA system 500, shown and explained in conjunction with FIG. 5. Further, the RDMA systems 700, 800, 900 of FIGS. 7-9 should be also read in conjunction with FIGS. 1-4, depicting the requesting device 100 and the responding device 300. As shown, the RDMA system 700 includes a requesting device, such as the requesting device 100, shown and explained in conjunction with FIGS. 1-2. The RDMA system 700 also includes two responding devices, such as the responding devices 300, shown and explained in conjunction with FIGS. 3-4. Similarly, each of the RDMA systems 800, 900 includes a single requesting device, such as the requesting device 100, and a pair of responding devices, such as the requesting devices 300.

In an embodiment, as show in FIG. 7, in operation, the requesting device 100 is in communication with multiple responding devices, such as the responding devices 300. Further, the requesting device 100 communicates with the responding devices 300 via multiple messages. As shown, the requesting device 100 transmits a first message 702 (for example, QP 11) and a second message 704 (for example, QP 21) to one of the two responding devices 300 (such as a first responding device). Similarly, the requesting device 100 transmits a third message 706 (for example, QP 12) and a fourth message 708 (for example, QP 22) to another of the two responding devices 300 (such as a second responding device). Typically, each of the first, second, third and fourth messages 702, 704, 706, 708 relates to a Queue Pair(s), which at elementary level includes work elements that constitute RDMA data packets. In the present embodiment, the requesting device 100 is configured and operable to transmit the first, second, third and fourth messages 702, 704, 706, 708 in a manner such that each message carries both data and hints. In other words, the RDMA system 700 depicts an exemplary scenario in which multiple QPs are transmitted by the requesting device 100 to multiple responding devices 300 and hints for each QP are sent on the same QP.

In another embodiment, as shown in FIG. 8, in operation, the requesting device 100 is in communication with the responding devices 300 via multiple messages. As shown, the requesting device 100 transmits a first message 802 (for example, QP 21), a second message 804 (for example, QP 21) and a special message 806 (for example QP 101) to one of the two responding devices 300 (such as a first responding device). Similarly, the requesting device 100 transmits a third message 812 (for example, QP 12), a fourth message 814 (for example, QP 22) and a special message 816 (for example QP 102) to another one of the two responding devices 300 (such as a second responding device). In the present embodiment, the requesting device 100 is configured and operable to transmit the first, second, third and fourth messages 802, 804, 812, 814 in a manner such that each message carries only data. Further, the requesting device 100 is configured and operable to transmit the special messages 806, 816 carrying aggregated hints. For example, the special messages 806 carries aggregated hints of the first and second messages 802, 804, and, similarly, the special message 816 carries aggregated hints of the third and fourth messages 812, 814. In other words, the RDMA system 800 depicts an exemplary scenario in which a special management QP is used for each pair of a requesting and responding devices to aggregate hints from all QPs between the pair of the requesting and responding devices.

In yet another embodiment, as shown in FIG. 9, in operation, the requesting device 100 is in communication with the responding devices 300 via multiple messages. As shown, the requesting device 100 transmits a first message 902 (for example, QP 11), a second message 904 (for example, QP 21) and a special multicast message 910 (for example QP 200) to one of the two responding devices 300 (such as a first responding device). Similarly, the requesting device 100 transmits a third message 912 (for example, QP 12), a fourth message 914 (for example, QP 22) and the same special multicast message 910 (for example QP 200) to another one of the two responding devices 300 (such as a second responding device). In the present embodiment, the requesting device 100 is configured and operable to transmit the first, second, third and fourth messages 902, 904, 912, 914 in a manner such that each message carries only data. Further, the requesting device 100 is configured and operable to transmit the special multicast message 910 carrying all the hints. For example, the special multicast message 910 carries the hints of the first, second, third and fourth messages 902, 904, 912, 914. In other words, the RDMA system 900 depicts an exemplary scenario in which a special "multicast" UD QP is used to aggregate hints from all QPs and send them to all the responding devices 300. Further, each of the responding devices 300 infers which hints are relevant to it, according to its active QP with the requesting device 100.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A requesting device, comprising a memory, a controller and a communication interface, the memory being configured to store a plurality of work elements in one or more requesting queues, each work element indicating a requestor, a responder and an operation, the controller being configured to:
    retrieve a first work element and a second work element of the plurality of work elements from the memory, the first work element being for a first responder, the second work element being for a second responder;
    generate a first hint message and a second hint message, the first hint message comprising an indication of at least one operation of the first work element, the second hint message comprising an indication of at least one operation of the second work element;
    transmit, concurrently, the first hint message to a first responding device over the communication interface and the second hint message to a second responding device over the communication interface, the first responding device corresponding to the first responder of the first work element and the second responding device corresponding to the second responder of the second work element;
    transmit a first request relating to the at least one operation of the first work element to the first responding device over the communication interface, the first request indicating the at least one operation of the first work element; and
    transmit a second request relating to the at least one operation of the second work element to the second responding device over the communication interface, the second request indicating the at least one operation of the second work element.

2. The requesting device according to claim 1, wherein the first work element further includes an object list comprising one or more objects on which the operation is to be performed, and wherein the first hint message further includes an indication of at least one of the one or more objects.

3. The requesting device according to claim 1, wherein the controller is further configured to receive a confirmation message from the first responding device prior to transmitting the first request relating to the operation.

4. The requesting device according to claim 1, wherein the controller is further configured to retrieve a batch of work elements of the plurality of work elements, and to change a size of the batch during operation.

5. The requesting device according to claim 1, wherein the first hint message further includes an indication of a memory area related to the operation.

6. The requesting device according to claim 5, wherein the indication of the memory area and the operation include an address to the memory area on which the operation is to be performed.

7. The requesting device according to claim 5, wherein the indication of the memory area and the operation include a prefetch operation for prefetching the indicated memory area.

8. The requesting device according to claim 5, wherein the indication of the memory area and the operation include a cache warm up operation.

9. The requesting device according to claim 5, wherein indication of the memory area and the operation include an atomic operation.

10. The requesting device according to claim 1, wherein the first hint message is a dedicated hint command message.

11. The requesting device according to claim 1, wherein the first hint message comprises the indication of the operation as an additional payload of a command message of another command.

12. The requesting device according to claim 1, wherein the requesting device is arranged for Remote Direct Memory Access (RDMA).

13. A method for a requesting device, the method comprising:
  storing a plurality of work elements in one or more requesting queues in a memory, each work element indicating a requestor, a responder and an operation;
  retrieving a first work element and a second work element of the plurality of work elements from the memory, the first work element being for a first responder, the second work element being for a second responder;
  generating a first hint message and a second hint message, the first hint message comprising an indication of at least one operation of the first work element, the second hint message comprising an indication of at least one operation of the second work element; and
  transmitting, concurrently, the first hint message to a first responding device over the communication interface and the second hint message to a second responding device over the communication interface, the first responding device corresponding to the first responder of the first work element and the second responding device corresponding to the second responder of the second work element;
  transmitting a first request relating to the operation of the first work element to the first responding device over the communication interface, the first request indicating the operation of the first work element; and
  transmitting a second request relating to the operation of the second work element to the second responding device over the communication interface, the second request indicating the operation of the second work element.

14. A non-transitory computer-readable medium carrying computer instructions that when loaded into and executed by a controller of a requesting device enables the requesting device to implement the method according to claim 13.

15. A responding device, the responding device comprising a memory, a controller, and a communication interface, the controller being configured to:
  receive a first hint message of a plurality of messages from a requesting device over the communication interface, the first hint message comprising an indication of at least one operation of a first work element, wherein another responding device receives a second hint message of the plurality of messages concurrently;
  determine a pre-emptive action based on the indication of the at least one operation;
  execute the pre-emptive action;
  receive a first request of a plurality of requests relating to the at least one operation of the first work element from the requesting device over the communication interface, the request indicating the at least one operation of the first work element; and
  execute the at least one operation of the first work element.

16. The responding device according to claim 15, wherein the operation relates to a memory area, wherein the controller is further configured to determine the pre-emptive action based on the memory area and the operation, and to execute the pre-emptive action by determining whether a loading of the memory area is required, and upon determining that the loading of the memory area is required, loading the memory area into the memory.

17. The responding device according to claim 15, wherein the controller is further configured to transmit a confirmation message to the requesting device, the confirmation message indicating whether the pre-emptive action was successful or not.

18. A method for a responding device, the method comprising:
  receiving a first hint message of a plurality of messages from a requesting device, the first hint message comprising an indication of at least one operation of a first work element, wherein another responding device receives a second hint message of the plurality of messages concurrently;
  determining a pre-emptive action based on the indication of the at least one operation;
  executing the pre-emptive action;
  receiving a first request of a plurality of requests relating to the at least one operation of the first work element from the requesting device, the request indicating the at least one operation of the first work element; and
  executing the at least one operation of the first work element.

19. A non-transitory computer-readable medium carrying computer instructions that when loaded into and executed by a controller of a responding device enables the responding device to implement the method according to claim 18.

20. The method according to claim 18, wherein the operation relates to a memory area, the method further comprising:
  determining the pre-emptive action based on the memory area and the operation;
  executing the pre-emptive action by determining whether a loading of the memory area is required; and
  upon determining that the loading of the memory area is required, loading the memory area into the memory.

21. The method according to claim 18, further comprising:
  transmitting a confirmation message to the requesting device, the confirmation message indicating whether the pre-emptive action was successful or not.

* * * * *